(12) United States Patent
Jones et al.

(10) Patent No.: US 7,792,967 B2
(45) Date of Patent: Sep. 7, 2010

(54) METHOD AND SYSTEM FOR SHARING AND ACCESSING RESOURCES

(75) Inventors: Scott A. Jones, Carmel, IN (US); Thomas E. Cooper, Indianapolis, IN (US); Brad Bostic, Carmel, IN (US)

(73) Assignee: Chacha Search, Inc., Carmel, IN (US)

( * ) Notice: Subject to any disclaimer, the term of this patent is extended or adjusted under 35 U.S.C. 154(b) by 350 days.

(21) Appl. No.: 11/774,852

(22) Filed: Jul. 9, 2007

(65) Prior Publication Data

US 2008/0016218 A1    Jan. 17, 2008

Related U.S. Application Data

(60) Provisional application No. 60/807,426, filed on Jul. 14, 2006.

(51) Int. Cl.
*G06F 15/173* (2006.01)
(52) U.S. Cl. .............................. 709/226; 707/3; 707/4; 707/5; 709/224; 709/225; 709/230
(58) Field of Classification Search .................. 709/226
See application file for complete search history.

(56) References Cited

U.S. PATENT DOCUMENTS

| | | |
|---|---|---|
| 5,559,940 A | 9/1996 | Hutson |
| 5,732,259 A | 3/1998 | Konno |
| 5,772,446 A | 6/1998 | Rosen |
| 5,862,223 A | 1/1999 | Walker et al. |
| 5,875,231 A | 2/1999 | Farfan et al. |
| 5,915,010 A | 6/1999 | McCalmont |
| 5,918,010 A | 6/1999 | Appleman et al. |
| 5,930,788 A | 7/1999 | Wical |
| 5,937,422 A | 8/1999 | Nelson et al. |
| 5,948,054 A | 9/1999 | Nielson |
| 5,983,221 A | 11/1999 | Christy |
| 5,987,457 A | 11/1999 | Ballard |
| 6,081,788 A | 6/2000 | Appleman et al. |
| 6,101,515 A | 8/2000 | Wical et al. |
| 6,157,926 A | 12/2000 | Appleman et al. |

(Continued)

FOREIGN PATENT DOCUMENTS

EP    1 193 625    4/2002

(Continued)

OTHER PUBLICATIONS

International Search Report issued Jan. 28, 2008 in PCT/US07/75369.

(Continued)

*Primary Examiner*—Firmin Backer
*Assistant Examiner*—Natisha Cox
(74) *Attorney, Agent, or Firm*—Staas & Halsey LLP

(57) ABSTRACT

A method and system for sharing and accessing resources useable to retrieve information is provided. Data of resources used by human providers to retrieve information in response to a query from requesters are maintained in a database for use in relation to subsequent queries. The method and system identifies categories and/or keywords of queries for which the resources were used to retrieve information and indicates the resources to providers and/or requesters as a search resource (s).

10 Claims, 20 Drawing Sheets

U.S. PATENT DOCUMENTS

| | | |
|---|---|---|
| 6,178,416 B1 | 1/2001 | Thompson et al. |
| 6,195,681 B1 | 2/2001 | Appleman et al. |
| 6,198,904 B1 | 3/2001 | Rosen |
| 6,212,545 B1 * | 4/2001 | Ohtani et al. ............... 709/202 |
| 6,223,165 B1 | 4/2001 | Lauffer |
| 6,226,648 B1 | 5/2001 | Appleman et al. |
| 6,314,420 B1 | 11/2001 | Lang et al. |
| 6,332,141 B2 | 12/2001 | Gonzalez et al. |
| 6,336,132 B2 | 1/2002 | Appleman et al. |
| 6,347,943 B1 | 2/2002 | Fields et al. |
| 6,421,675 B1 | 7/2002 | Ryan et al. |
| 6,430,558 B1 | 8/2002 | Delano |
| 6,434,549 B1 | 8/2002 | Linetsky et al. |
| 6,493,711 B1 | 12/2002 | Jeffrey |
| 6,507,841 B2 | 1/2003 | Riverieulx de Varax |
| 6,516,312 B1 * | 2/2003 | Kraft et al. ........................ 1/1 |
| 6,523,010 B2 | 2/2003 | Lauffer |
| 6,546,388 B1 | 4/2003 | Edlund et al. |
| 6,571,239 B1 | 5/2003 | Cole et al. |
| 6,578,010 B1 | 6/2003 | Teacherson |
| 6,578,022 B1 | 6/2003 | Foulger et al. |
| 6,598,043 B1 | 7/2003 | Baclawski |
| 6,633,867 B1 * | 10/2003 | Kraft et al. ..................... 707/3 |
| 6,647,383 B1 | 11/2003 | August et al. |
| 6,675,159 B1 | 1/2004 | Lin et al. |
| 6,708,165 B2 | 3/2004 | Jeffrey |
| 6,732,088 B1 | 5/2004 | Glance |
| 6,745,178 B1 | 6/2004 | Emens et al. |
| 6,766,320 B1 | 7/2004 | Wang et al. |
| 6,772,148 B2 | 8/2004 | Baclawski |
| 6,775,664 B2 | 8/2004 | Lang et al. |
| 6,845,369 B1 | 1/2005 | Rodenburg |
| 6,847,972 B1 | 1/2005 | Vernau et al. |
| 6,873,982 B1 | 3/2005 | Bates et al. |
| 6,895,406 B2 | 5/2005 | Fables et al. |
| 6,901,394 B2 | 5/2005 | Chauhan et al. |
| 6,947,924 B2 | 9/2005 | Bates et al. |
| 6,952,678 B2 | 10/2005 | Williams et al. |
| 6,978,264 B2 | 12/2005 | Chandrasekar et al. |
| 7,010,568 B1 | 3/2006 | Schneider et al. |
| 7,016,889 B2 | 3/2006 | Bazoon |
| 7,020,679 B2 | 3/2006 | Tian |
| 7,047,229 B2 | 5/2006 | Goel |
| 7,072,888 B1 * | 7/2006 | Perkins ............................ 1/1 |
| 7,076,497 B2 | 7/2006 | Donteverde |
| 7,085,771 B2 | 8/2006 | Chung et al. |
| 7,340,446 B2 * | 3/2008 | Rajarajan et al. ............... 707/3 |
| 2001/0009013 A1 | 7/2001 | Appleman et al. |
| 2001/0047290 A1 | 11/2001 | Petras et al. |
| 2002/0059395 A1 | 5/2002 | Liou |
| 2002/0062343 A1 | 5/2002 | Appleman et al. |
| 2002/0120609 A1 | 8/2002 | Lang et al. |
| 2002/0120619 A1 | 8/2002 | Marso et al. |
| 2002/0140715 A1 | 10/2002 | Smet |
| 2002/0147848 A1 | 10/2002 | Burgin et al. |
| 2002/0164004 A1 | 11/2002 | Tamura et al. |
| 2002/0167539 A1 | 11/2002 | Brown et al. |
| 2002/0198962 A1 | 12/2002 | Horn et al. |
| 2003/0014403 A1 | 1/2003 | Chandrasekar et al. |
| 2003/0018621 A1 * | 1/2003 | Steiner et al. ................... 707/3 |
| 2003/0046098 A1 | 3/2003 | Kim |
| 2003/0065774 A1 * | 4/2003 | Steiner et al. ............... 709/225 |
| 2003/0069878 A1 | 4/2003 | Wise |
| 2003/0084040 A1 | 5/2003 | Jeffrey |
| 2003/0120653 A1 | 6/2003 | Brady et al. |
| 2003/0140037 A1 | 7/2003 | Deh-Lee |
| 2003/0144895 A1 | 7/2003 | Aksu et al. |
| 2003/0145001 A1 | 7/2003 | Craig et al. |
| 2003/0163454 A1 | 8/2003 | Jacobsen et al. |
| 2003/0174818 A1 | 9/2003 | Hazenfield |
| 2003/0198325 A1 | 10/2003 | Bayne |
| 2003/0204501 A1 * | 10/2003 | Moon ............................ 707/3 |
| 2003/0208535 A1 | 11/2003 | Appleman et al. |
| 2003/0217335 A1 | 11/2003 | Chung et al. |
| 2004/0010484 A1 | 1/2004 | Foulger et al. |
| 2004/0023644 A1 | 2/2004 | Montemer |
| 2004/0024752 A1 | 2/2004 | Manber et al. |
| 2004/0049541 A1 | 3/2004 | Swahn |
| 2004/0107118 A1 | 6/2004 | Harnsberger et al. |
| 2004/0133469 A1 | 7/2004 | Chang |
| 2004/0162820 A1 | 8/2004 | James et al. |
| 2004/0167931 A1 | 8/2004 | Han |
| 2004/0177088 A1 | 9/2004 | Jeffrey |
| 2004/0203634 A1 | 10/2004 | Wang et al. |
| 2004/0210550 A1 | 10/2004 | Williams et al. |
| 2004/0243466 A1 | 12/2004 | Trzybinski et al. |
| 2004/0254920 A1 | 12/2004 | Brill et al. |
| 2005/0060217 A1 | 3/2005 | Douglas et al. |
| 2005/0080776 A1 | 4/2005 | Colledge et al. |
| 2005/0086290 A1 | 4/2005 | Joyce et al. |
| 2005/0091211 A1 | 4/2005 | Vernau et al. |
| 2005/0105712 A1 | 5/2005 | Williams et al. |
| 2005/0114299 A1 | 5/2005 | Bharat |
| 2005/0120003 A1 | 6/2005 | Drury et al. |
| 2005/0131866 A1 | 6/2005 | Badros |
| 2005/0136949 A1 | 6/2005 | Barnes, Jr. |
| 2005/0138193 A1 * | 6/2005 | Encarnacion et al. ........ 709/230 |
| 2005/0160065 A1 | 7/2005 | Seeman |
| 2005/0160107 A1 | 7/2005 | Liang |
| 2005/0165742 A1 | 7/2005 | Chin |
| 2005/0165766 A1 | 7/2005 | Szabo |
| 2005/0165777 A1 * | 7/2005 | Hurst-Hiller et al. ............ 707/4 |
| 2005/0165780 A1 | 7/2005 | Omega et al. |
| 2005/0198021 A1 | 9/2005 | Wilcox et al. |
| 2005/0198116 A1 | 9/2005 | Appleman et al. |
| 2005/0210042 A1 | 9/2005 | Goedken |
| 2005/0222975 A1 | 10/2005 | Nayak et al. |
| 2005/0256848 A1 | 11/2005 | Alpert et al. |
| 2005/0278317 A1 | 12/2005 | Gross et al. |
| 2005/0289124 A1 | 12/2005 | Kaiser et al. |
| 2005/0289168 A1 | 12/2005 | Green et al. |
| 2006/0010105 A1 | 1/2006 | Sarukkai et al. |
| 2006/0015488 A1 | 1/2006 | Perisic et al. |
| 2006/0015498 A1 | 1/2006 | Sarmiento et al. |
| 2006/0020593 A1 | 1/2006 | Ramsaier et al. |
| 2006/0026147 A1 | 2/2006 | Cone et al. |
| 2006/0026152 A1 | 2/2006 | Zeng et al. |
| 2006/0037022 A1 * | 2/2006 | Byrd et al. ..................... 718/104 |
| 2006/0041550 A1 | 2/2006 | Bennett et al. |
| 2006/0041562 A1 | 2/2006 | Paczkowski et al. |
| 2006/0064404 A1 | 3/2006 | Kishore et al. |
| 2006/0064411 A1 | 3/2006 | Gross et al. |
| 2006/0069674 A1 * | 3/2006 | Palmon et al. ................... 707/3 |
| 2006/0070012 A1 | 3/2006 | Milener et al. |
| 2006/0074863 A1 | 4/2006 | Kishore et al. |
| 2006/0074891 A1 * | 4/2006 | Chandrasekar et al. .......... 707/3 |
| 2006/0074984 A1 | 4/2006 | Milener et al. |
| 2006/0095345 A1 | 5/2006 | Ka et al. |
| 2006/0100956 A1 | 5/2006 | Ryan et al. |
| 2006/0122979 A1 | 6/2006 | Kapur et al. |
| 2006/0122991 A1 | 6/2006 | Chandrasekar et al. |
| 2006/0129536 A1 | 6/2006 | Foulger et al. |
| 2006/0129541 A1 | 6/2006 | Morgan et al. |
| 2006/0155694 A1 * | 7/2006 | Chowdhury et al. ............ 707/4 |
| 2006/0287916 A1 | 12/2006 | Starr et al. |
| 2006/0288087 A1 | 12/2006 | Sun |
| 2007/0005344 A1 | 1/2007 | Sandor et al. |
| 2007/0014537 A1 | 1/2007 | Wesemann et al. |
| 2007/0027859 A1 | 2/2007 | Harney et al. |
| 2007/0050388 A1 | 3/2007 | Martin |

2007/0073894 A1* 3/2007 Erickson et al. .............. 709/230

FOREIGN PATENT DOCUMENTS

| EP | 1 341 099 | 9/2003 |
|---|---|---|
| JP | 2001-202390 | 7/2001 |
| JP | 2001-357068 | 12/2001 |
| WO | WO 03/056467 | 7/2003 |

OTHER PUBLICATIONS

International Search Report issued Feb. 12, 2008 in PCT/US07/60467.
International Search Report issued Feb. 27, 2008 in PCT/US07/60459.
International Search Report issued Feb. 15, 2008 in PCT/US07/60468.
International Search Report issued Feb. 7, 2008 in PCT/US07/60472.
Carmel et al., "Searching XML Documents via XML Fragments," 2003, ACM, pp. 151-158.
Karat et al., "Patterns of Entry and Correction in Large Vocabulary Continuous Speech Recognition Systems," 1999, ACM, pp. 568-575.
Google Tutor, "Googling from your Mobile Phone—no Web Browser Needed!," 2005, Google Tour.
Varshney et al., "Voice Over IP," 2002, Communications of the ACM, vol. 45, No. 1, pp. 89-96.
Knoblock, Craig A., "Searching the World Wide Web," 1997, IEEE Expert, pp. 8-14.
Sullivan, Danny, "Google Launches Personalized Home Page," Search Engine Watch, May 2005.
U.S. Appl. No. 11/336,928, filed Jan. 23, 2006, Scott A. Jones, Chacha Search, Inc.
U.S. Appl. No. 11/647,286, filed Jul. 10, 2006, Scott A. Jones et al., Chacha Search, Inc.
U.S. Appl. No. 11/469,732, filed Jul. 10, 2006, Scott A. Jones et al., Chacha Search, Inc.
U.S. Appl. No. 11/647,437, filed Jan. 29, 2006, Scott A. Jones et al., Chacha Search, Inc.
U.S. Appl. No. 11/647,309, filed Jan. 29, 2006, Scott A. Jones et al., Chacha Search, Inc.
U.S. Appl. No. 11/777,505, filed Jul. 13, 2006, Scott A. Jones et al., Chacha Search, Inc.
U.S. Appl. No. 11/779,502, filed Jul. 18, 2007, Scott A. Jones et al., Chacha Search, Inc.
U.S. Appl. No. 11/462,559, filed Aug. 4, 2006, Scott A. Jones et al., Chacha Search, Inc.
U.S. Appl. No. 11/652,506, filed Jan. 11, 2007, Scott A. Jones, Chacha Search, Inc.
U.S. Appl. No. 11/780,297, filed Jul. 19, 2006, Scott A. Jones et al., Chacha Search, Inc.
U.S. Appl. No. 11/780,241, filed Jul. 19, 2007, Scott A. Jones et al., Chacha Search, Inc.
U.S. Appl. No. 11/819,719, filed Jun. 28, 2007, Scott A. Jones et al., Chacha Search, Inc.
U.S. Appl. No. 11/835,080, filed Aug. 7, 2007, Scott A. Jones, Chacha Search, Inc.
U.S. Appl. No. 11/835,016, filed Aug. 7, 2007, Scott A. Jones et al., Chacha Search, Inc.
U.S. Appl. No. 11/834,911, filed Aug. 7, 2007, Scott A. Jones, Chacha Search, Inc.
"GoodLawyer: Help with Legal Questions (California)".
U.S. Appl. No. 11/647,286, filed Dec. 29, 2006, Scott A. Jones et al., Chacha Search, Inc.
U.S. Appl. No. 11/469,732, filed Sep. 1, 2006, Scott A. Jones et al., Chacha Search, Inc.
U.S. Appl. No. 11/647,437, filed Dec. 29, 2006, Scott A. Jones et al., Chacha Search, Inc.
U.S. Appl. No. 11/777,505, filed Jul. 13, 2007, Scott A. Jones et al., Chacha Search, Inc.
U.S. Appl. No. 11/652,506, filed Jan. 12, 2006, Scott A. Jones et al., Chacha Search, Inc.
European Communication issued in corresponding European Application No. 07717987.7-1527 dated May 12, 2009.
European Communication issued in corresponding European Application No. 07762508.5-1527 dated May 12, 2009.
International Preliminary Report on Patentability issued in corresponding International Application No. PCT/US2007/073151.
Nicole Koffey, Webhelp.com Answers Questions With a Personal Touch, Nov. 30, 1999.

* cited by examiner

| Category | Subcategory | Name | Resource Information | Description |
|---|---|---|---|---|
| Arts | Animation | Animation World Network™ | http://www.awn.com/ | Provides information resources to the international animation community. Features include searchable database archives, monthly magazine, web animation guide, the Animation Village, discussion forums and other useful resources. |
| Arts | Animation | The Big Cartoon Database | http://www.bcdb.com/ | Cartoon database and animation list. Offers online searchable database of cartoon shorts and animation on the Internet. |
| Arts | Animation | Anime Nation | http://www.animenation.com/ | Anime link database with verified links submitted from fans all over the world. |
| Arts | Antiques | Alice | http://www.antiqueappeal.com/alinks/pages/ | ALICE - Antique Links on the Internet, Come Explore) our directory and search engine of antique and collectible web sites on the Internet |
| Arts | Antiques | Antique Mystique | http://www.antiquemystique.com/cgi-bin/search/ilink.cgi | A free submission searchable link directory |
| Arts | Antiques | SearchEngineGuide's List of Antiques Resources | http://www.searchengineguide.com/links/search.cgi?query=antiques&bool=and&substring=0 | List of antiques resources |
| Papers | Physics | Sample paper | C:/my paper on physics.doc | Paper related to physics |

202  204  206  208  210

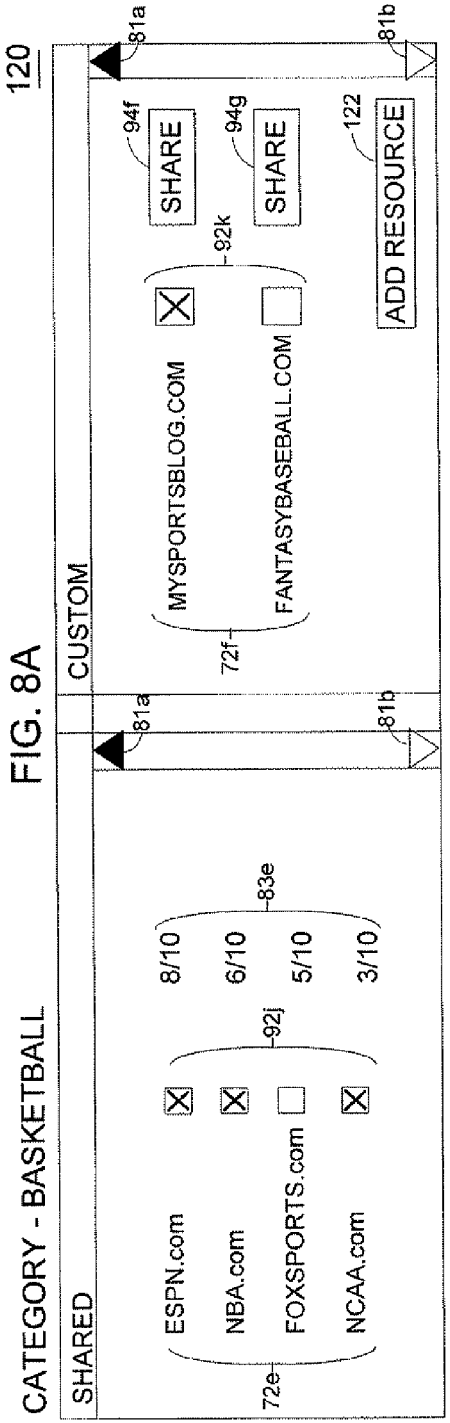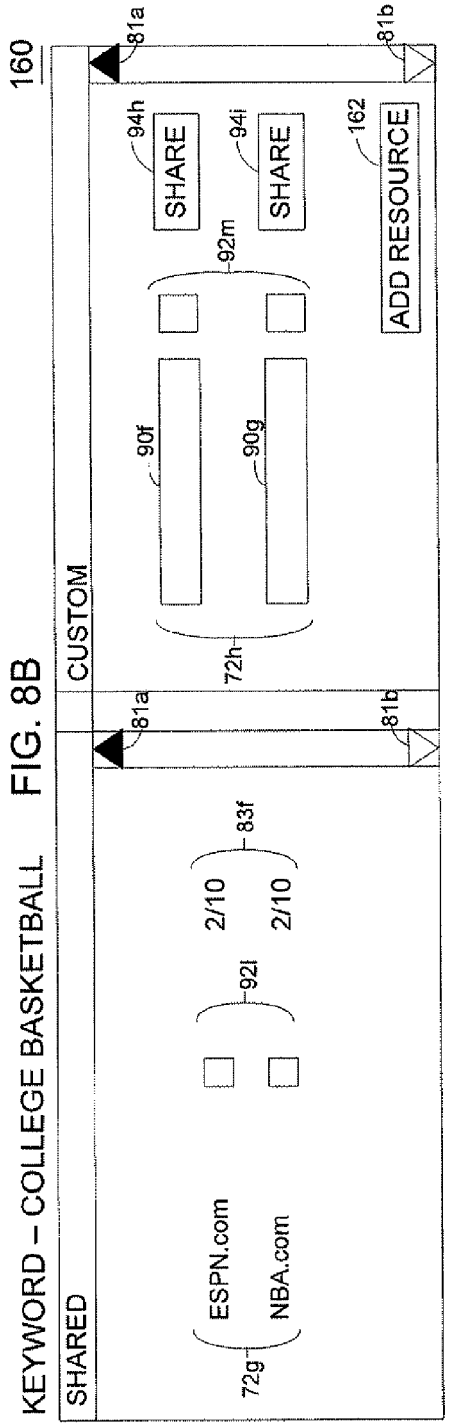

```
< QUERY >
    < ORIGINAL >
        Original query text as submitted by user/requester
    < /ORIGINAL >
    < PARSED >
        Query broken down into individual keywords without stop word(s)
    < /PARSED >
    < KEYWORDS >
        < KEYWORD >
            < KEYWORD CATEGORY = " ___ " SubCategory = " ___ " Value = " ___ " >
                < RESOURCES >
                    < RESOURCE TITLE = " ___ " >
                        URI
                    < /RESOURCE TITLE >
                    •••
                    < RESOURCE TITLE = " ___ " >
                        URI
                    < /RESOURCE TITLE>
                < /RESOURCES >
            < /KEYWORD CATEGORY >
        < /KEYWORD >
        •••
        < KEYWORD >
            < KEYWORD CATEGORY = " ___ " SubCategory = " ___ " Value = " ___ " >
            < /KEYWORD CATEGORY >
        < /KEYWORD >
    < /KEYWORDS >
< /QUERY >
```

FIG. 12

METHOD AND SYSTEM FOR SHARING AND ACCESSING RESOURCES

CROSS-REFERENCE TO RELATED APPLICATIONS

This application is related to and claims the benefit of U.S. Application Ser. No. 60/807,426, filed Jul. 14, 2006, inventor Scott A. Jones, et al., titled METHOD AND SYSTEM FOR SHARING AND ACCESSING RESOURCES, in the United States Patent and Trademark Office, the disclosure of which is incorporated herein by reference.

BACKGROUND

1. Field

The present invention is directed to use of resources for searches and, more particularly, to associating a resource with at least one category or keyword and making the resource available for subsequent searches associated with the category or keyword.

2. Description of the Related Art

Although the increasing amount of information that has become available over the Internet has led to the development of various resources such as search engines, Internet directories, etc. that may be utilized to obtain information, locating desired information requires knowledge of resource(s) capable of returning relevant results in response to a search. Aside from the complexity of formulating a search query or keyword for retrieving information using a particular resource, a user must have knowledge of and locate the particular resource to utilize the resource for the search. However, current search environments do not provide users with information about resources best suited for returning information pertaining to a particular subject matter, category or keyword desired by the users.

Even after a user locates resources that may be suited for a search related to a category or keyword(s), the user must remember which resource(s) produced relevant results for the category or keyword(s) to subsequently refer to the resource (s). Without the user independently providing the resources, other users must independently determine suitability of a resource(s) and locate the resource(s) for a search. Specifically, known methods for sharing of resource(s) among users are at most ad hoc, i.e., e-mails between friends and colleagues which may contain "favorites" or "bookmarks", or a list of links for further research on a website and ordinarily each user independently determines the value of resource(s) for returning results pertaining to a given subject matter.

Locating resources for searches is even more difficult for users of portable devices such as cellular phones because multiple searches may be required to determine which resources are capable of returning desired information, requiring the users to repeatedly interact with and view contents resulting from the searches. Cellular phone users are sometimes frustrated by the limited display capability and awkward input methods of cellular phones, which further complicates searches when using a cellular phone and other similar devices.

Although various types of resources are available for locating information via the Internet, there is a need for a method and system for efficiently sharing and accessing resources among users.

SUMMARY

A system and method are disclosed for sharing resource(s) across a network including identifying a resource utilized for a search in association with a keyword contained in the search (sometimes referred to as a search query) and distributing the resource to providers registered to accept searches related to the keyword. The keyword, which may be comprised of multiple words, may represent the entire search query. Given that a keyword may represent the entire search query, references to keyword in the text below would also apply to a search (or a search query).

The method and system include determining whether a keyword associated with a query has corresponding resource (s) and identifying that search resource to a requester and/or provider.

The system may include a requester device submitting a query, a provider device receiving the query for a search and a database for storing at least one resource associated with retrieving information pertaining to content of the query.

The method includes recording prior usage of resources in association with a keyword or category, displaying the resource(s) as available resources to providers correlated with the keyword or category and enabling each of the providers to selectively use the resources.

These together with other aspects and advantages which will be subsequently apparent, reside in the details of construction and operation as more fully hereinafter described and claimed, reference being made to the accompanying drawings forming a part hereof, wherein like numerals refer to like parts throughout.

BRIEF DESCRIPTION OF THE DRAWINGS

FIG. 3A is a relationship diagram illustrating correlation between categories, subcategories, keywords and resources.

FIGS. 8A and 8B illustrate interfaces for configuring resources and associating them with a category and/or keyword.

FIG. 12 illustrates an example message structure of a query.

DETAILED DESCRIPTION OF THE PREFERRED EMBODIMENTS

Figure 1:
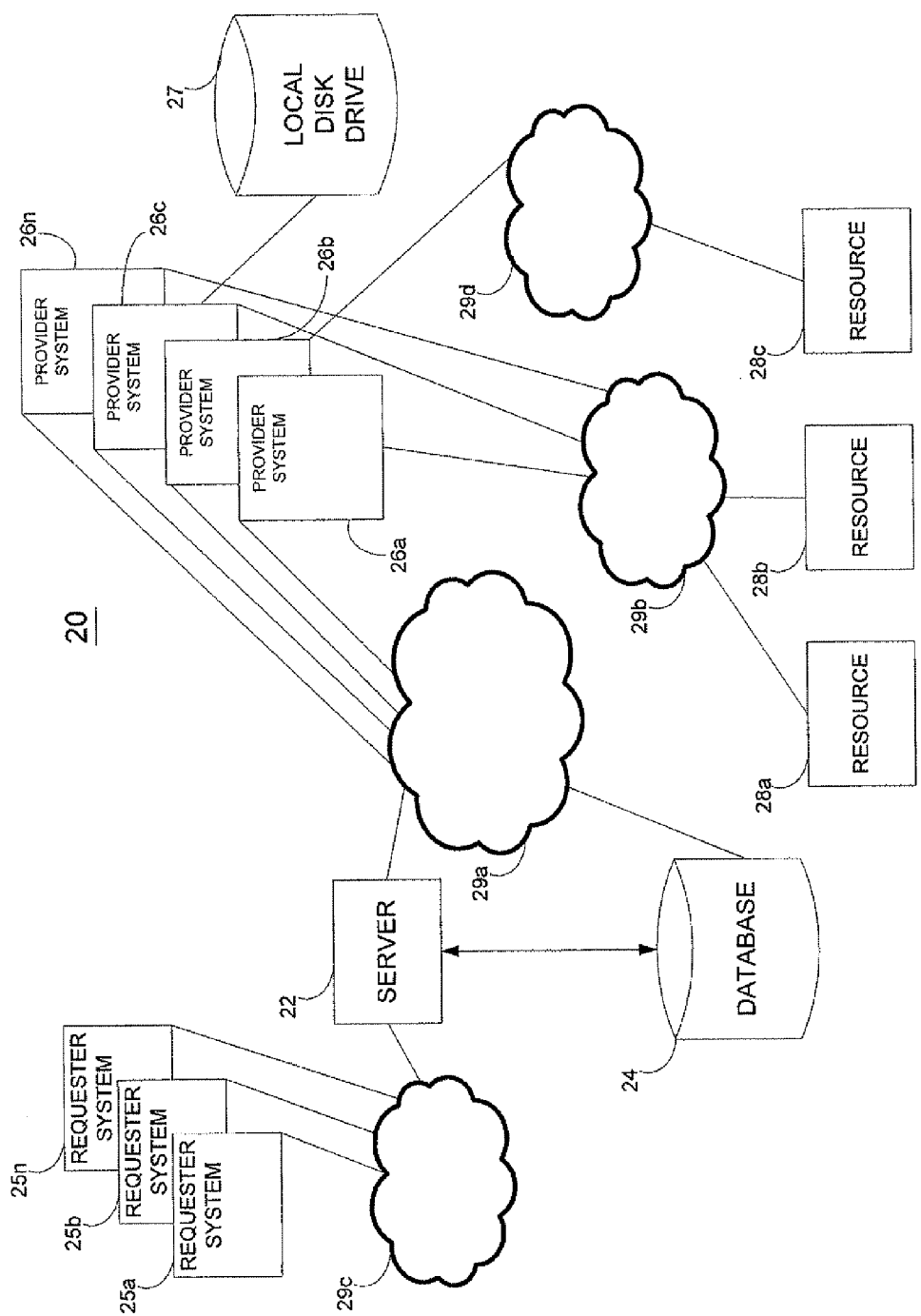
FIG. 1 is a block diagram of a system for sharing and accessing resources.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated are understood as would normally occur to one skilled in the art to which the embodiments relate.

A method and system for sharing and accessing resources for searches is disclosed. A resource is a system, an application program, a search tool or any other source from which a provider may obtain information. That resource may be accessible using the Internet, public and private databases including results of previous searches, data accumulated based on a knowledge base accessible to the provider, etc., including text, image, multimedia, or any other electronic information. A provider or searcher (PaidSearcher™) is a human searcher who has registered to accept search requests and may be a professional, an amateur and/or volunteer searcher. A requester (InfoSeeker™) is a user submitting a search request seeking information for the user or on behalf of another person, organization or other entity. A request may be a fully-formed question, or other sentence, keyword(s) or a search phrase, asking for information.

An exemplary system 20 for sharing and accessing resources is illustrated in FIG. 1. As shown in FIG. 1, the system 20 includes server 22 with access to database 24 which may be part of the server 22 or a separate database server connected thereto. The data in the database 24 may be stored in any conventional manner, including in a Network Attached Storage (NAS), a Storage Area Network (SAN), etc. using any conventional or proprietary database software including, MySQL®, Oracle®, SQL® Server, Sybase®, Progress®, DB2®, etc. Hardware platforms such as Windows Server® 2003, LINUX® (Red Hat®, SUSE®, Debian®, CentOS), UNIX® (Solaris™, HPUX, AIX®, SCO®), etc., may be used for the database 24 and/or the server 22. The system 20 may be similar to the system discussed in U.S. patent application Ser. No. 11/336,928, filed Jan. 23, 2006, by Scott A. Jones, entitled, "A Scalable Search System Using Human Searchers," and incorporated herein by reference.

The server 22 receives search requests submitted to the system 20, delivers results returned by provider systems 26 to requesters using requester systems 25 and manages resources 28 utilized by the provider systems 26 with respect to searches. For example, the server 22 manages search requests received by the system 20, including results submitted in response to the requests and resource(s) used for obtaining results associated with categories, subcategories or keywords in the requests. An exemplary relationship diagram depicting entities involved with managing resources in the system 20 is explained in detail below with respect to FIG. 11.

The server 22 communicates with database 24 that maintains records of the resources utilized by the provider systems 26 in performing searches associated with a category or keyword(s) and usage information of the resources, provider(s) who conducted the searches, default resource(s) to be used when a provider is unavailable to accept requests pertaining to a particular category or keyword, etc. The database 24 includes information about category, subcategory or keyword(s) associated with requests and resources used for responding to the requests including categories and keywords defined by the system 20 or that may be determined from requests submitted by users. How resources, categories and keywords are maintained by the system 20 is explained in detail below with respect to FIGS. 2 and 3.

The provider systems 26 including provider systems 26a through 26n are connected with the server 22 and the database 24 via network 29a and with resources 28 via networks 29b and 29d. The provider systems 26 may connect with the resources 28 using the same network or different networks. For example, as illustrated in FIG. 1, provider system 26b may connect to resource 28c via network 29d and provider systems 26a, 26c and 26n may connect to resources 28a and 28b via network 29b. Networks 29a, 29b, 29c, 29d may be a global public network of networks (the Internet) or consist in whole or in part of one or more private networks. For example, resource 28c might be accessible to only certain providers via a private network on a college campus. Providers use the provider systems 26 to execute searches submitted to the system 20 by requesters (or InfoSeekers™). The provider systems 26 may be any text- or speech-based systems such as a desktop or laptop computer system, a handheld device, a cellular telephone, a specialized terminal, or any source that allows a provider to conduct a search using one or more of the resources 28.

Although provider systems 26 in FIG. 1 are shown to access the resources 28 via networks 29b and 29d, the present invention does not limit providers to resources accessible only via these networks. As shown in FIG. 1, provider system 26c may use information stored in local disk drive 27. For example, a provider may use a private database accessible only to the provider such as a database of information previously gathered by the provider, results from previous requests, or from databases that require payment for access or information available to the provider in non-electronic form, such as a book on the provider's bookshelf, knowledge base of the provider, etc.

A resource may be made accessible to a provider via information such as a URI (Uniform Resource Identifier). A provider may share a resource(s) using URI information. The URI information may be a "bookmark" or "favorite", commonly used in an internet browser application, such as FireFox®, Safari™, Microsoft® Internet Explorer, etc. URI information may be a resource for conducting a search.

The requester systems 25 are connected to the server 22 via network 29c. Similar to the provider systems 26, the requester systems 25 may be any text- or speech-based device using which a request may be submitted to the server 22. For example, a requester (i.e., InfoSeeker™) may use requester system 25a to request information about the closing time of a particular restaurant in Indiana using keyword(s), a search phrase, 'passive' data such as GPS, area code, etc. Although the requester systems 25 are shown to connect to the server 22 via the network 29c in FIG. 1, the present invention is not limited to any particular type or number of networks for submitting requests to the server 22 via the requester systems 25.

Figure 2:
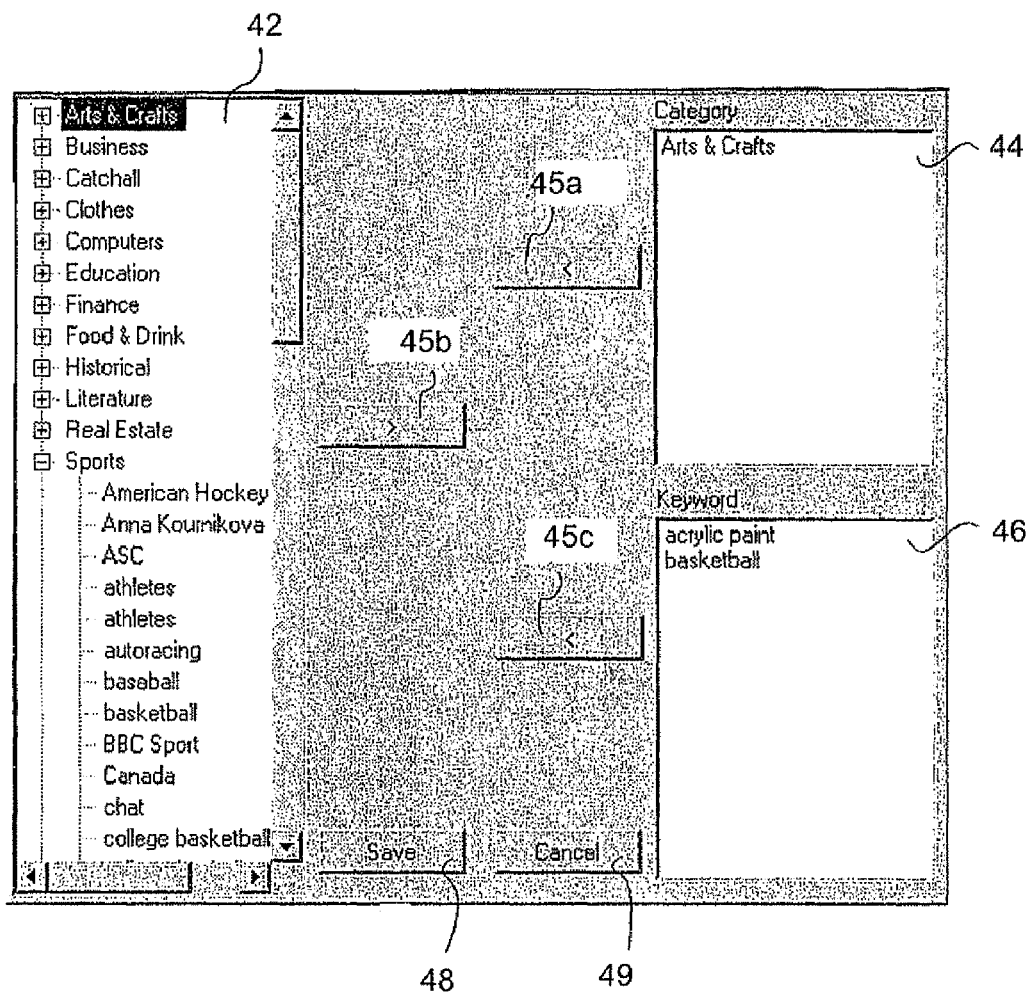
FIG. 2 illustrates an interface for selecting a category or keyword.

An exemplary embodiment of a graphical user interface (GUI) 40 used by a provider for selecting a category and/or keyword(s) to be associated with the provider is illustrated in FIG. 2. When a provider registers with the system 20 (FIG. 1), the provider may identify a category, subcategory or keyword(s) with which the provider is associated. Currently, the system 20 (FIG. 1) contains 16 categories, approximately 400 subcategories and 1.5 million keywords that are expected to grow based on use of the system 20. Further, information in the database 24 pertaining to categories, subcategories, keywords, etc., may be licensed from an external source such as Trellian®, located in Australia. As shown in FIG. 2, the GUI 40 includes categories and keywords frame 42 displaying a list of available categories and keywords maintained by the system 20 (FIG. 1), a category frame 44 identifying each selected category and a keyword frame 46 indicating each selected keyword. The categories and keywords currently associated with the provider are indicated in category frame 44 and the keyword frame 46, respectively. For example, in FIG. 2, the category pertaining to "Arts & Crafts" and the keywords "acrylic paint" and "basketball" are currently selected to be associated with the provider.

A provider may modify category or keyword(s) associated with the provider by selecting a category and/or keyword(s) from the categories and keywords frame 42 and selecting button 45b which respectively adds the selected category and/or keyword(s) to the category frame 44 and the keyword frame 46. Similarly, the provider may remove or de-select a category or keyword(s) associated with the provider by selecting the category from the category frame 44 and/or the keyword from the keyword frame 46 and using button 45a to de-select the category and button 45c to de-select the keyword(s). While selection and de-selection of a category or keyword(s) is described using buttons 45, the present invention is not limited to any particular interface for enabling a provider to select or de-select a category or keyword with which the provider is associated. For example, a provider may select or de-select a category and/or keyword(s) by clicking thereon and dragging and dropping the category or the keyword(s) between the categories and keywords frame 42, the category frame 44 and/or the keyword frame 46. Some categories, subcategories, or keywords might be restricted in the system 20 (FIG. 1) so that they may not be able to be selected at a particular time and statistical information may be displayed with the categories, subcategories, or keywords as described in U.S. patent application Ser. No. 11/336,928. Some categories, subcategories, or keywords may also be associated with a provider by the system, which may be related to geographic data (GPS, zip code), or other attributes of the provider.

As shown in FIG. 2, the GUI 40 includes a save button 48 for storing a current modification to a category and/or keyword associated with a provider including selection and/or de-selection of the category and/or keyword and a cancel button 49 for canceling the current modification. For example, a category selected in response to a current operation of the provider may be stored in the database 24 (FIG. 1) in association with the provider when the save button 48 is selected and cancelled when the cancel button 49 is selected.

Figure 3:
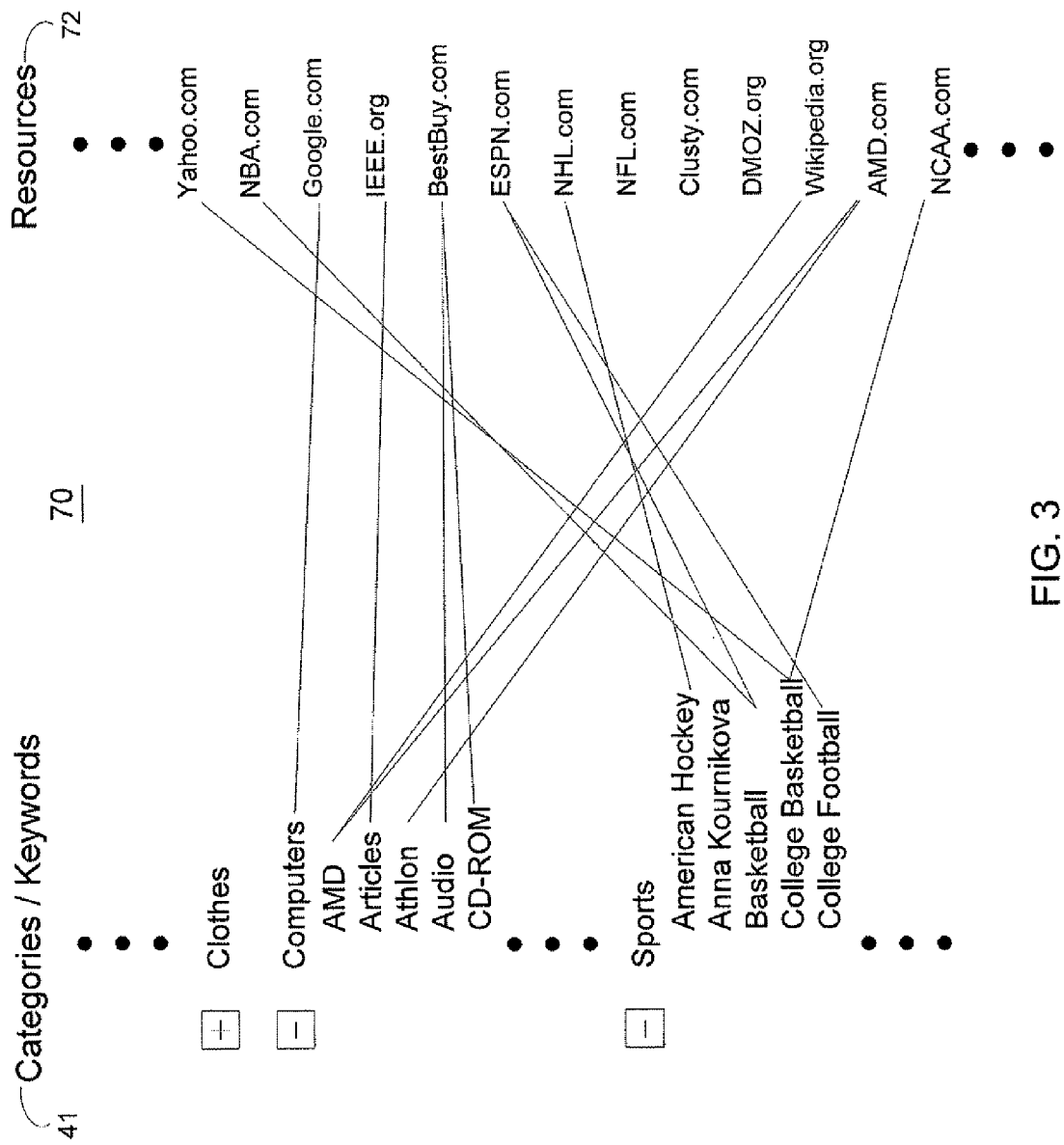
FIG. 3 is a relationship diagram illustrating correlation between categories and resources.
Figure 11:
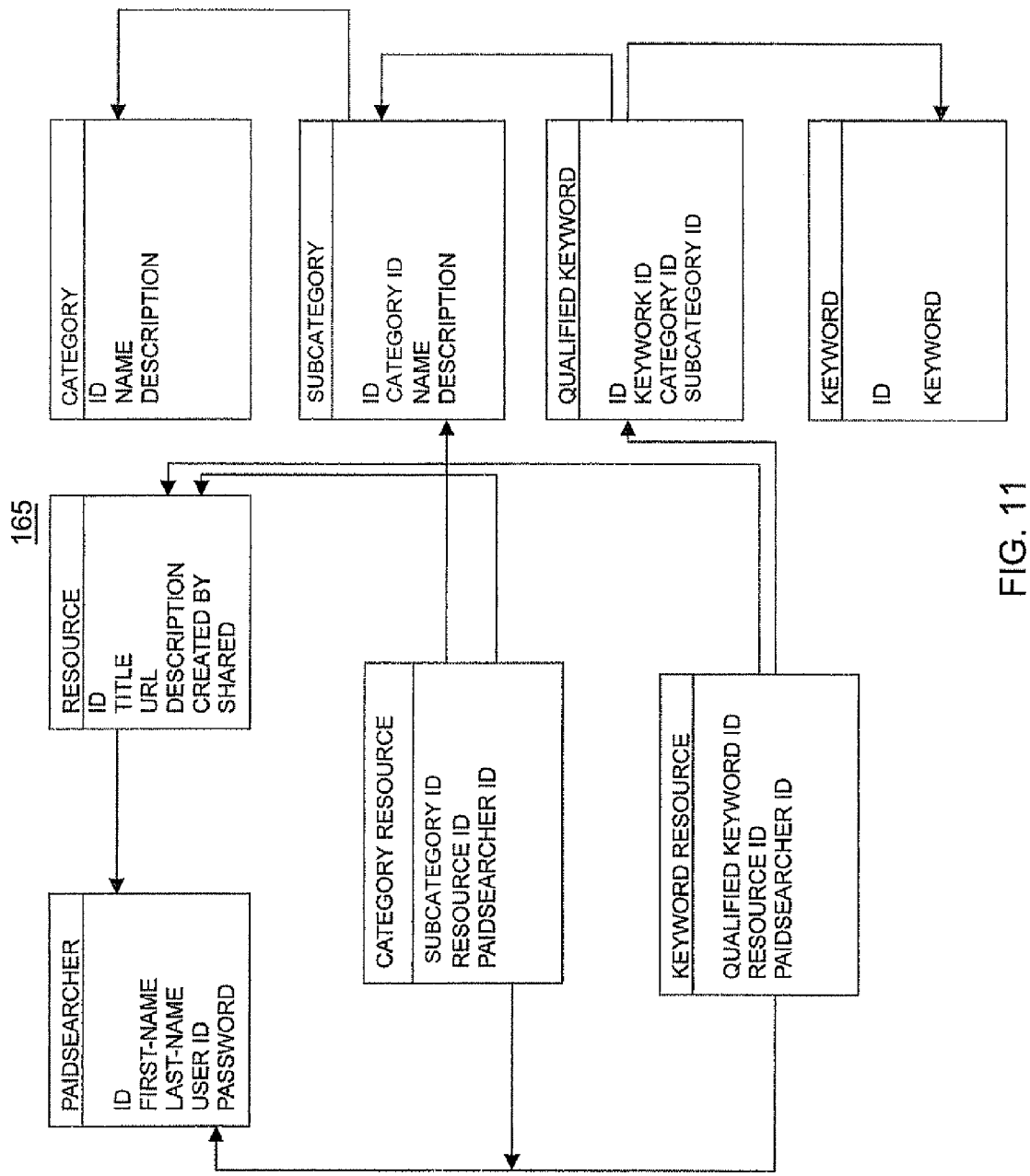
FIG. 11 is a relationship diagram illustrating management of resources.

FIG. 3 is a simplified example of a relationship 70 illustrating correlations between categories/keyword(s) 41 maintained in the database 24 of system 20 (FIG. 1) and resources 72 associated with searches for those categories/keywords 41 (described in FIG. 11 in detail). For example, for search request(s) related to the keyword "AMD", Wikipedia.org and AMD.com are identified as resources associated with the keyword "AMD." As another example, Yahoo.com and NCAA.com were used as resources for search request(s) associated with the keyword "College Basketball."

Preferably, the disclosed method and system extract content of a search request and determine how influential a keyword is within the search request string to associate the search request with one or more categories/keyword(s) 41 and resources 72. Determination of influence of keyword(s) is explained in detail below with respect to FIG. 12. Although a particular keyword may cause the system 20 (FIG. 1) to select a provider who is associated with that particular keyword, the system 20 may present resource(s) to that provider that are tied to one or more of the keywords (or categories or subcategories) in the query phrase. In other words, resources may be gathered from the resource lists associated with multiple keywords (categories and/or subcategories).

FIG. 3A is a simplified example of a relationship table 200 illustrating correlations between categories 202, subcategory 204 and resources 208 maintained in the database 24 of system 20 (FIG. 1). As shown in FIG. 3A, the relationship table 200 may include name 206, description 210 and resource information 208 of the resources correlated with each category 202 and subcategory 204. For example, the web site of Animation World Network™ is identified as a resource for request(s) related to the category "Arts", specifically the subcategory "Animation."

Figure 4:
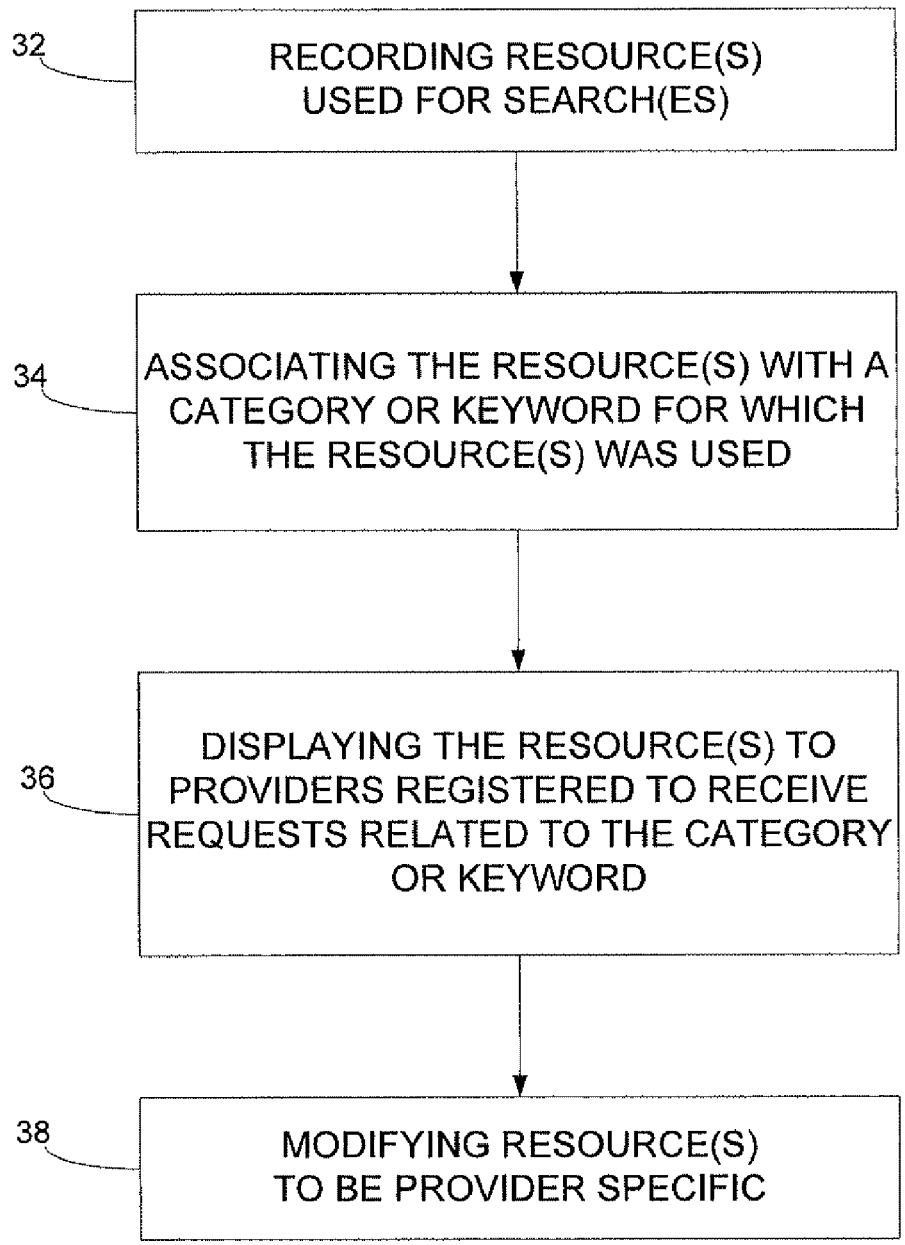
FIG. 4 is a flowchart for displaying resource(s) in association with a category or keyword.

An exemplary process 30 for presenting resource(s) to providers is illustrated in FIG. 4. As shown in FIG. 4, process 30 begins by recording resource(s) used for search(es) 32. When a search is executed using one or more resources associated with a category or keyword(s), the resource(s) are recorded. For example, when ESPN.com®, NBA.com and Yahoo.com are used for a search to locate information in response to a request associated with the keyword "basketball", ESPN.com®, NBA.com and Yahoo.com are stored as resources associated with the keyword "basketball."

Recording resource(s) used for search(es) 32 includes storing information with respect to the resources such as Uniform Resource Identifiers (URIs), Uniform Resource Locators (URLs), other links, sequences of operations or web pages for accessing the resources including paths to the resources, an index to a particular location of a resource within a web page, possibly a username/password for access, etc. Information of the recorded resource(s) may include text, images, links, HTML, Internet directories, macro commands for accessing resources, etc. For example, an access process for a resource(s) may be programmed such that subsequent access to the resource is automatically executed.

After recording the resource(s) 32, process 30 continues by associating 34 the resource(s) with a category or keyword(s) based on usage. Using the example of FIG. 3, ESPN.com®, NBA.com and NCAA.com may be associated with the category "sports", the keyword "basketball" and/or other relevant categories or keywords including but not limited to "professional basketball", "athletes", etc. That is, a correlation is created in database 24 of system 20 (FIG. 1) between the resources and the keyword as visually depicted in FIG. 3 (see also FIG. 11). Furthermore, specific pages at these websites might be used, such as "soccernet.espn.go.com" where a search for "Michael" might return only an advertisement related to Michael Vick, whereas the same search on the ESPN® home page might provide easy access to news related to Michael Vick.

Subsequent to associating 34 the resources with a category or keyword(s), process 30 continues by displaying the resource(s) 36 to providers registered to receive requests related to the category or keyword(s). As described above, each provider registered with the system 20 (FIG. 1) may identify at least one category or keyword, with which the provider is associated for search requests. Further, the category or keyword(s) selected by a provider may be updated or modified by a provider as needed, for example, as a provider's experience develops, area(s) of interest change, etc. The system 20 (FIG. 1) may offer new keywords, categories, or subcategories, for example, when providers gain access to resources, demonstrate greater expertise, or otherwise improve, or the system 20 may preferentially restrict providers from signing up for new keywords, categories or subcategories. In addition, a provider may be associated with multiple categories or keywords and receive requests associated with any of the categories or keywords.

Displaying resource(s) to providers includes identifying provider(s) registered to accept searches which are associated with one or more category or keyword indicated in the categories and keyword(s) frame 42 (FIG. 2). For example, a provider registered to accept requests pertaining to the keyword "basketball" will be presented with resource(s) associated with the keyword "basketball" while resource(s) associated with the category "arts & crafts" will be displayed to a provider registered to accept requests pertaining to the category "arts & crafts."

After displaying the resource(s) 36 to providers process 30 continues modifying resource(s) 38 in accordance with input from the providers, change in use of the resource(s) or any other factor affecting association of the resource(s) with a particular category or keyword(s). For example, when a provider does not find a resource useful, or changes the resource's association with a particular category or keyword, or modifies the path of a resource to direct the provider to a particular index within the resource, etc., the resource(s) may be modified, customized, etc. to be specific to the provider.

Figure 5:
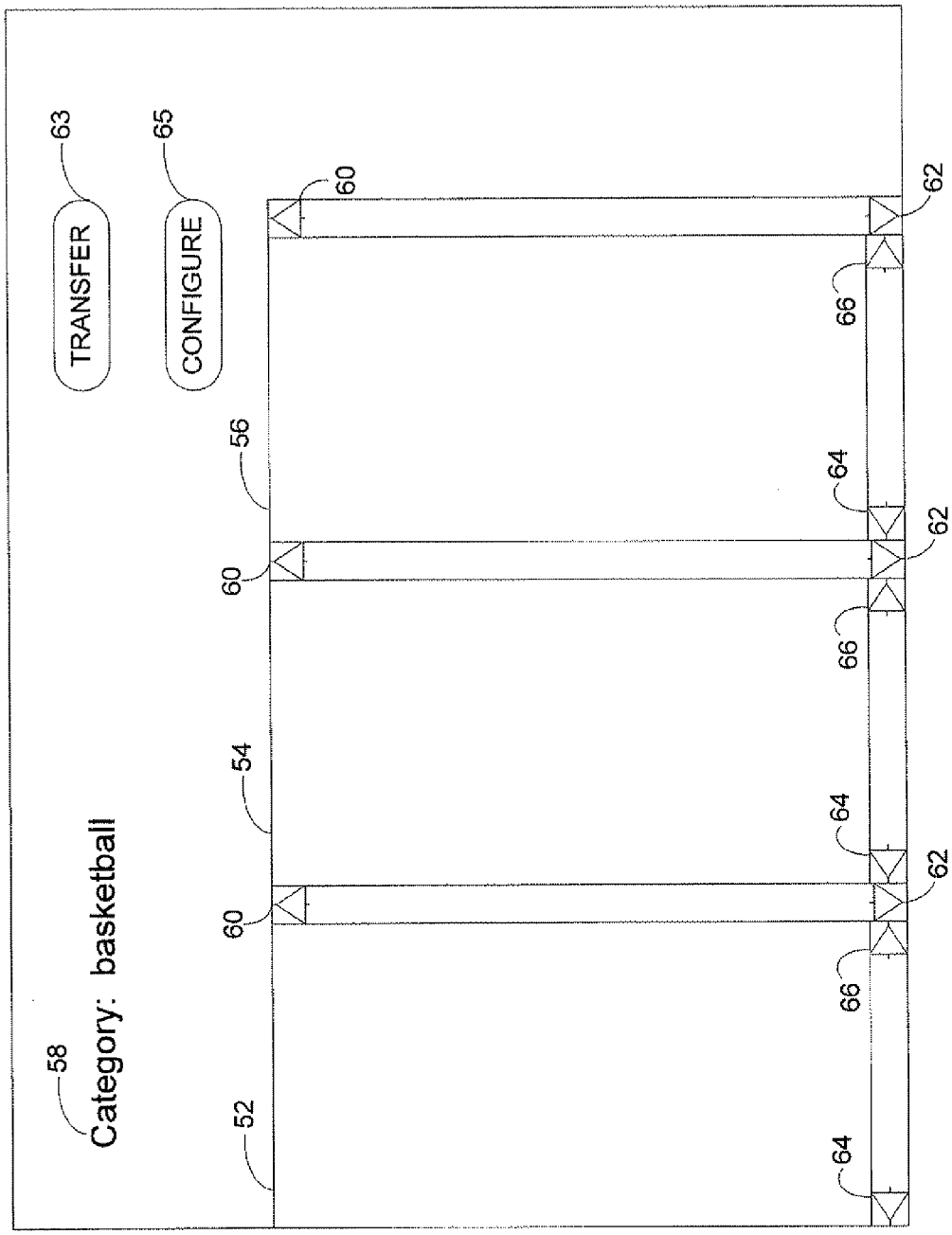
FIG. 5 illustrates an interface for displaying resources associated with a category.

FIG. 5 illustrates a GUI 50 for selecting resources associated with a category. As shown in FIG. 5, for category 58 directed to "basketball", resource windows 52, 54 and 56 are configured to display contents obtained from resources associated with that category. For example, the resource windows 52, 54 and 56 may display contents obtained from ESPN-.com®, NBA.com and NCAA.com that are associated with the category "basketball." Although three resource windows are indicated in FIG. 5, the GUI 50 may include any number of resource windows in which the contents of resources are displayed. The resource windows 52, 54 and 56 may display information including text, images, links, videos, etc., using HTML, XML, XHTML, cascading style sheets, Java Script, etc., or other data available over the Internet and/or from a local network which can be accessed by the system 20.

In a preferred embodiment, a predetermined number of resources are displayed to a provider using GUI 50 during initial login to the system 20 (FIG. 1). For example, the six most commonly used resources associated with a category or keyword(s) for which a provider is registering may be preselected based on usage of resources by other providers associated with the category or keyword(s) for presentation to a provider. The present invention is not limited to any particular criteria for determining which resources to present to a newly registered provider. For example, a newly registered provider associated with the category "basketball" may be presented with a predetermined number of resources associated with categories or keywords of registered providers who have fulfilled requests associated with the category "basketball" or the keyword "NBA" or with resources identified by the administrator(s) of the system 20 (FIG. 1), or by any combination of these. Further, resource(s) may be defined for a category or keyword for which no provider has registered by administrator(s) of the system 20 which may be superceded by usage of the resource(s) over time, modified by providers given special authorization such as highly successful veteran providers, etc. Some providers may also be restricted from adding resources until they demonstrate proficiency, skill, seniority, etc.

The resource windows 52, 54 and 56 are each provided with elements 60, 62, 64 and 66 for viewing and navigating contents displayed therein. More specifically, elements 60 and 62 enable scrolling up and down within each resource window 52, 54 and 56 and elements 64 and 66 enable scrolling from one side of each resource window 52, 54 and 56 to the other. The elements 60, 62, 64 and 66 may be similar to typical graphical user interfaces of application programs that provide navigational capabilities on a page of information.

The GUI 50 may include a transfer button 63 enabling a provider to pass a request to another provider if a provider does not feel qualified to conduct a search in response to a request and preferably includes a configure button 65 to allow a provider to view and modify resource(s) as explained in detail below with respect to FIG. 7. For example, a transfer operation discussed in U.S. patent application Ser. No. 11/336,928 may be used to transfer a request to a suitable provider.

If a provider does not feel qualified to fulfill a request that was assigned to the provider, the provider may transfer a request to another provider via the transfer button 63 to preferably get the requester better results expeditiously. The provider may also be compensated in some way for choosing to transfer a request to another provider. In some cases, the compensation for the original provider may be dependent upon the success of the next provider. However, if the request is transferred more than a preset number of times (e.g. 3 times), then the server 22 (FIG. 1) may return a "default" answer of at least one of the top resources associated with the keyword(s) of the query string. This ensures, for example that the requester is receiving no worse results than those of at least one of the top search resources.

When a provider selects to "transfer" a request to another provider, the request may be sent back to the server 22 (FIG. 1) to select another provider based on keywords, etc. The provider may also transfer a request to another provider by selecting keyword(s) that seems most likely to have providers associated with it that will be able to fulfill the request. In other words, a human can determine what seems to be the most relevant keyword in the request. Further, the provider can clarify the request by adding or modifying the category or keyword(s) associated with the request for the next provider. As part of the transfer, some or all of the "instant message" or "chat" interaction between the requester and the first provider (as described in the interface below) may be transferred to the subsequent provider so that there is history and context that does not need to be repeated between the requester and the new provider.

The transfer capability illustrated with FIG. 5 may be used to give keywords their ranking, and influence the selection of provider(s) during initial routing of a request to an appropriate provider(s). For example, if an initial provider (associated with an initial keyword) identifies additional or different keyword(s) to associate with this request, the weighting of the initial keyword may decrease and the weighting of the new keyword(s) may increase.

Figure 6:
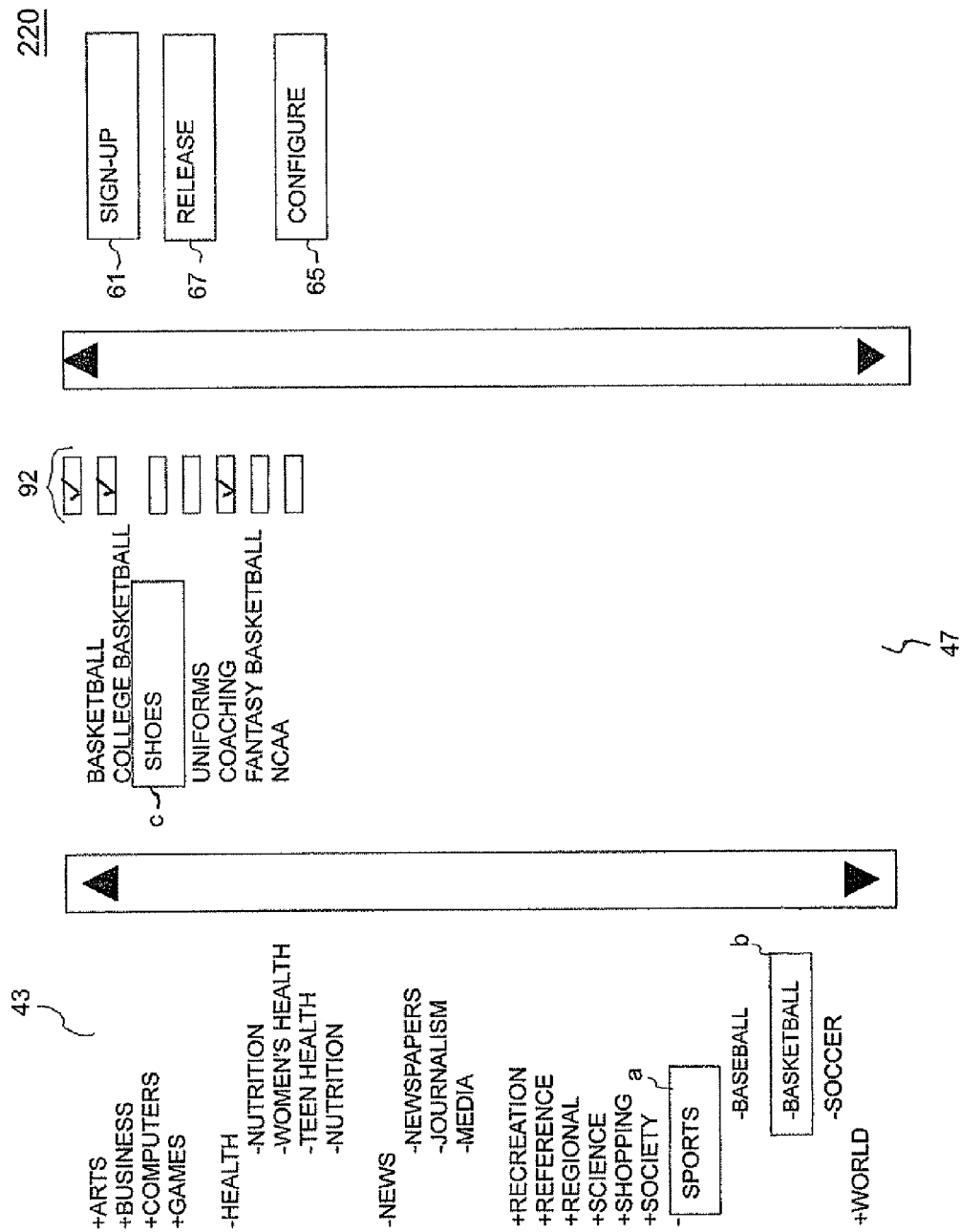
FIG. 6 illustrates a Graphical User Interface (GUI) for selecting categories and/or subcategories.

FIG. 6 illustrates a GUI 220 providing a tree-view and/or outline view for selection of categories, subcategories and keywords maintained in the system 20 (FIG. 1). As shown in FIG. 6, the GUI displays hierarchical information of categories and subcategories 43 identifying keywords 47 associated with a specific category and subcategory that are maintained by the database 24 (FIG. 1). For example, a provider may be presented with category(ies) and/or subcategories with which the provider was associated during registration or that contain keyword(s) with which the provider can choose to be associated. As indicated by the boxes denoted a, b, c, for example, the provider may choose "sports" as a category, "basketball" as a subcategory from the categories/subcategories 43 and "shoes" as a keyword 47. Upon selection of a keyword, a provider may add the keyword to be associated with the provider using sign-up button 61, remove the keyword from being associated with the provider using release button 67, or configure resource(s) associated with the keyword with which the provider has been associated using configure button 65. Configuration of resource(s) is explained in detail below with respect to FIGS. 7, 8A, 8B, 9A and 9B.

Figure 7:
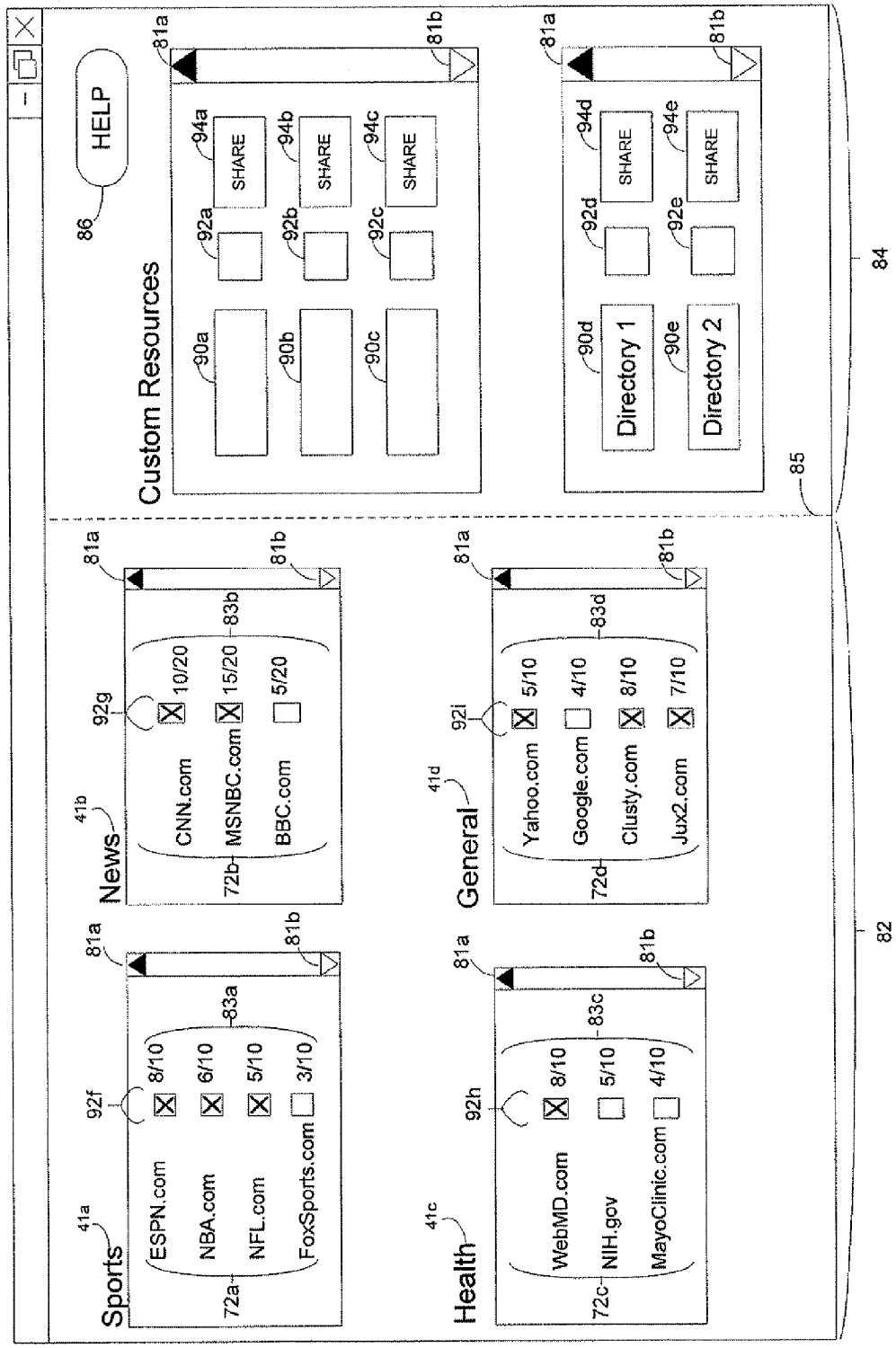
FIG. 7 illustrates an interface for displaying public and private resources.

FIG. 7 illustrates an exemplary GUI 80 for viewing and/or configuring resources. As illustrated in FIG. 7, the GUI 80, by which the provider may modify resource(s) associated with category(ies), subcategory(ies), or keyword(s), includes a public workspace 82 displaying resource(s) available to any provider(s) that have registered for accepting searches associated with the categories, subcategories and/or keywords and a private workspace 84 identifying custom resources available to a specific provider or provider network as described in U.S. application Ser. No. 11/647,309, filed Dec. 29, 2006, inventor Scott A. Jones, et al., titled INSTANT MESSAGE NOTIFICATION OF SERVICE PROVIDERS, which is incorporated herein by reference. For example, the public workspace 82 may be created by selecting a provider in the database 24 (FIG. 1), following the links to associated keyword(s) of that provider, and/or from the keyword(s), identifying corresponding resource(s). While the public workspace 82 shows multiple categories/subcategories/keyword(s) 41 and associated resources 72, the present invention is not limited to any particular interface for presenting the categories/subcategories/keyword(s) 41 and associated resource(s) 72. For example, as denoted by dotted line 85 in the configure screen 80, a provider may be presented with a screen that identifies custom resource(s) 90 specific to a particular category, subcategory or keyword associated with the provider and other categories, subcategories or keywords and/or resources accessible to any provider(s) may be displayed in another screen.

Alternatively, the public workspace 82 may also include resource(s) used for requests associated with categories, subcategories and/or keywords for which a provider has not registered. For example, a selected number of resources from each category, subcategory and/or keyword may be presented to a provider as secondary resources while resources of a category, subcategory and/or keyword associated with the provider are presented as primary resources. In addition, particular resources, for example, those most used by providers associated with a category, subcategory and keyword may be presented to a requester when a provider is unavailable for requests associated with that category, subcategory or keyword. Accordingly, resources for a particular request associated with non-primary keywords (i.e. keywords that were not associated with the provider chosen to accept a request) may be presented to all providers and/or the requester.

In addition, providers may selectively share resources. For example, certain resources may be shared with a set of providers associated with a keyword while other resources are shared with a set of providers registered in association with a different keyword. As such, a provider may choose to share some resources that reveal privileged information (e.g. this disclosure) with registered providers associated with a keyword (e.g., "patents"), while sharing a different set of resources (e.g., the ChaCha® Newsletter) with providers associated with the keyword "any provider." Further, the system 20 (FIG. 1) may make a determination of functionality of resource(s) presented for use by the providers. For example, the system 20 may periodically check functionality of resources by determining whether the resources have successfully been used for recent searches and confirming usability of resources which have not been used over a period of time.

The configure screen 80 includes a help button 86 providing assistance in configuring resource(s) in the private workspace 84. Although help is triggered via the help button 86, the present invention is not limited to any particular interface for providing assistance. For example, the help may be offered by selecting an option in a drop-down menu, dragging a question mark to an area on the screen, sending an e-mail to another provider or the system administrator(s), etc. The configure screen 80 may also provide a description of resources 72a, 72b, 72c, 72d. For example, if a provider wants to know about a particular resource, the provider may "cursor over" the resource to view a description pertaining to the resource. However, the configure screen 80 is not limited to any particular way of presenting information of a resource, for example, a pop-up window displaying description information of the resource may be provided when a provider selects the name of the resource, etc.

The public workspace 82 includes resources 72a, 72b, 72c, 72d that are presented to any associated providers including resources which have been previously identified, for example, during initial registration by other providers, based on actual usage of the resources by other providers, by providers adding resources using the configure button 65 (FIGS. 5 and 6), by providers using resources spontaneously during a real-time (or non realtime) search on behalf of a requester, etc. The configure screen 80 provides the resources 72a, 72b, 72c, 72d as recommended (public resources). Although resources 72a, 72b, 72c, 72d may be displayed to all providers associated with the displayed categories/keywords 41a, 41b, 41c, 41d, respectively, preferably, a provider is able to selectively use any of the resources 72a, 72b, 72c, 72d. For example, a provider may choose to de-select one or more of the resources 72a, 72b, 72c, 72d that have marks indicating selection for current use in boxes 92f, 92g, 92h, 92i and/or select other(s) by placing a mark next to resources indicated as being unselected by the absence of a mark in corresponding boxes 92f, 92g, 92h, 92i.

The private workspace 84 indicates custom resources specific to a provider and may include elements such as icons, checkboxes, URL input field(s), etc., to allow the provider to have a unique individual control over resources to be used. The private workspace 84 includes input fields 90a, 90b, 90c, 90d, 90e for entering new resources such as URLs of web sites, Internet directories such as Zeal®, DMOZ, personal knowledge base(s), etc. to be added as resources by a provider, and share buttons 94 for specifying resources a provider wishes to share with other providers registered in the system 20 (FIG. 1). For example, if a provider finds that Mamma.com® returns relevant results for requests associated with the category "health", the provider may identify the URL in the field 90a and select share 94a to make it a shared resource for the category "health" in the public workspace 82, which may cause it to be made accessible via the public workspace 82.

As shown in FIG. 7, the resources 72a, 72b, 72c, 72d and the input fields 90a, 90b, 90c, 90d, 90e may be provided in a scrollable manner where elements 81a and 81b enable scrolling up and down a list of resources. The elements 81a (shaded triangle) and 81b (unshaded triangle) may be used to indicate that there are other available resources viewable by scrolling and indicate that all shared resources of a category are currently displayed, respectively.

When a provider identifies a resource to be shared with other providers, the provider may be able to input information pertaining to the resource such as a URL, a resource path, associated category or keyword(s), title, or any other information describing the resource to be shared. The provider may share information about any resource including information pertaining to an application, a search tool or any other information relevant to use of the resource. For example, a provider may specify a page from a web site in the input field 90a in association with a category or keyword and select the share button 94a to make the page available to other registered providers associated with the category or keyword. In such a situation, an entry is made into the database 24 of the system 20 (FIG. 1) associating the category or keyword to an entry added to the database 24 for the resource, the page address in this case. The share functionality presented via the configure screen 80, however, is not limited to sharing of a particular type of resource information. For example, a program code identifying a series or sequence of operations or string of characters required for locating a resource may be specified in the input fields 90 and shared among other providers.

The configure screen 80 may indicate rank of usage 83 of resources, for example, based on a ratio of the number of registered providers associated with a category or keyword(s) who have selected a particular resource for requests associated with the category/keyword(s) compared to the total number of registered providers associated with the category or keyword(s). In the example illustrated in FIG. 7, 8 of the 10 providers registered for the category "sports" use ESPN-.com® for searches, while 5 of the 10 providers use NFL.com. However, the ranking of resources in the present invention is not limited to any particular criteria or threshold and any other factor pertinent to efficient and accurate searches may be considered in ranking resource(s). For example, if 50% of the providers that are registered for the category "basketball" use ESPN.com® as a resource for conducting searches and 20% use Yahoo.com, corresponding percentages may be indicated as rank of usage 83.

In addition, as the number of resources used by providers increases, only the highest-ranking resources may be displayed in the public workspace 82. Using the same example discussed above, since Yahoo.com is used by 20% and ESPN.com® by 50% of providers registered for the category "basketball", Yahoo.com may not be presented as a resource in the public workspace 82. Further, resources in the public workspace 82 that are utilized by less than 50% of the providers associated with a category or keyword may be indicated with a different characteristic, for example, may be grayed out while those used by more than 50% are not, although the checkboxes 92 would remain active permitting selection of lower ranked resources.

The resources 72a, 72b, 72c, 72d may also be ranked by tracking resources used to return search results to requesters by providers using the server 22 (FIG. 1) and ranking the resources most heavily used to return results higher than those that are used for searching, but not for supplying results. This, for example, may provide better ranking of resources because the ranking is tied to results returned to the requesters as opposed to popularity among providers.

FIGS. 8A and 8B illustrate configure screen 120 and 160 pertaining to the category "basketball" and the keyword "college basketball", respectively. For example, when a provider selects the category "basketball" and selects the configure button 65 shown in FIG. 6, the configure screen 120 is presented to the provider to enable configuration of resource(s) associated with the category "basketball." Using the same example, if the provider had selected the keyword "college basketball" from the listed keywords 47 (FIG. 6) and selected configure button 65, configure screen 160 pertaining to the keyword "college basketball" is presented to the provider.

As shown in FIG. 8A, the configure screen 120 includes a list of resources 72e that are shared among providers associated with the category "basketball" and a list of resources 72f that are particular (or customized) to a provider. The configure screen 160 in FIG. 8B illustrates shared resources 72g with respect to the keyword "college basketball" and provides input fields 90f and 90g for enabling input of new custom resources 72h such as URLs of web sites, Internet directories, etc., to be added as resources by a provider. Similar to the configure screen 80 shown in FIG. 7, the configure screens 120 and 160 include checkboxes 92j, 92k, 92l, 92m indicating selection or de-selection of resources 72e, 72f, 72g, 72h and input fields 90f and 90g for current use and share buttons 94f, 94g, 94h, 94i allowing a provider to share particular resource(s) with other providers registered in the system 20 (FIG. 1).

The configure screens 120 and 160 may include usage indicators 83e and 83f to provide information pertaining to use of resources 72e and 72g by providers associated with the category "basketball" and the keyword "college basketball", respectively. As mentioned above with respect to FIG. 7, the usage indicators 83e and 83f may indicate use of the resources, for example, based on selection of a corresponding resource for use by providers registered for a particular category, subcategory and/or keyword. When a provider has completed configuring resource(s), the provider may use a save button 48a to store a selected configuration or may cancel the selected configuration using a cancel button 49a. Accordingly, providers can manage associated resources at the category, subcategory and/or keyword level.

When a provider is fulfilling a query request (in a session with an InfoSeeker™), the provider is not limited to any particular resource configured as discussed above with respect to FIGS. 8A and 8B. For example, a provider may use other resources on an ad-hoc basis without being restricted to any resource to retrieve information in response to a query from a requester. As illustrated in FIGS. 8A and 8B, the system 20 (FIG. 1) enables a provider to dynamically add a resource to the custom resource list associated with the category "basketball" and the keywords "college basketball" by selecting add resource buttons 122 and 162, respectively. The add resource buttons 122 and 162 may be implemented within a browser component of a provider application program enabling the system 20 (FIG. 1) such that each defined resource associated with a query may be launched in individual embedded browser panes within the application program used by a provider as illustrated in FIG. 5. The provider may also launch ad-hoc browser requests in embedded browser panes as described in U.S. application Ser. No. 11/647,286, filed Dec. 29, 2006 inventor Scott A. Jones, et al., titled AUTOMATED TOOL FOR HUMAN ASSISTED MINING AND CAPTURING OF PRECISE RESULTS, which is incorporated herein by reference.

Figure 9A:
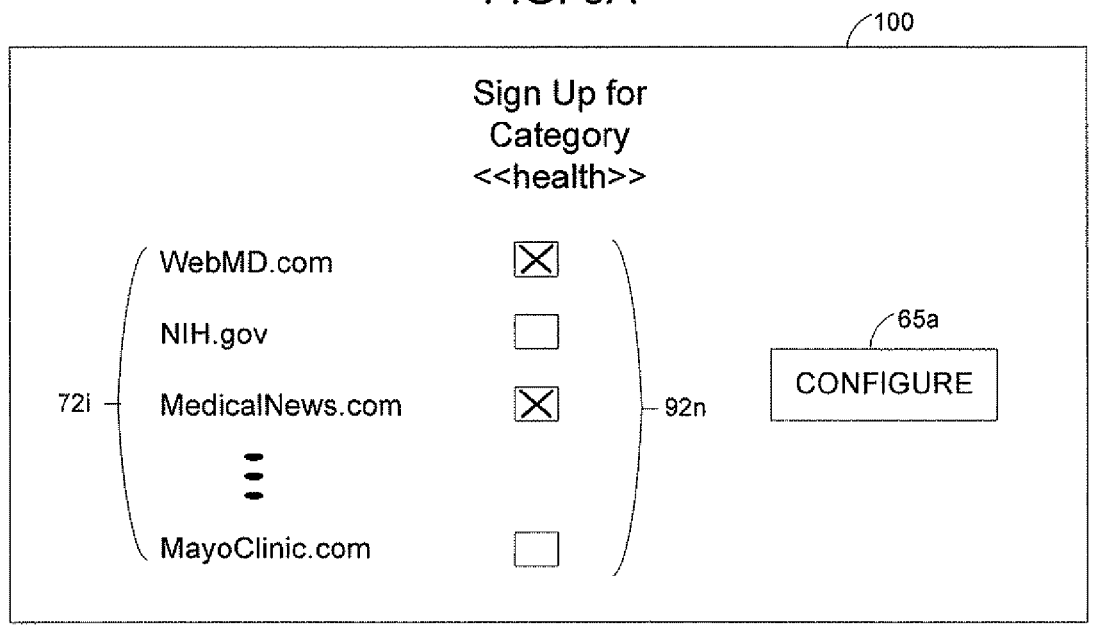
FIGS. 9A and 9B illustrate interfaces for providing resources associated with corresponding categories.
Figure 9B:
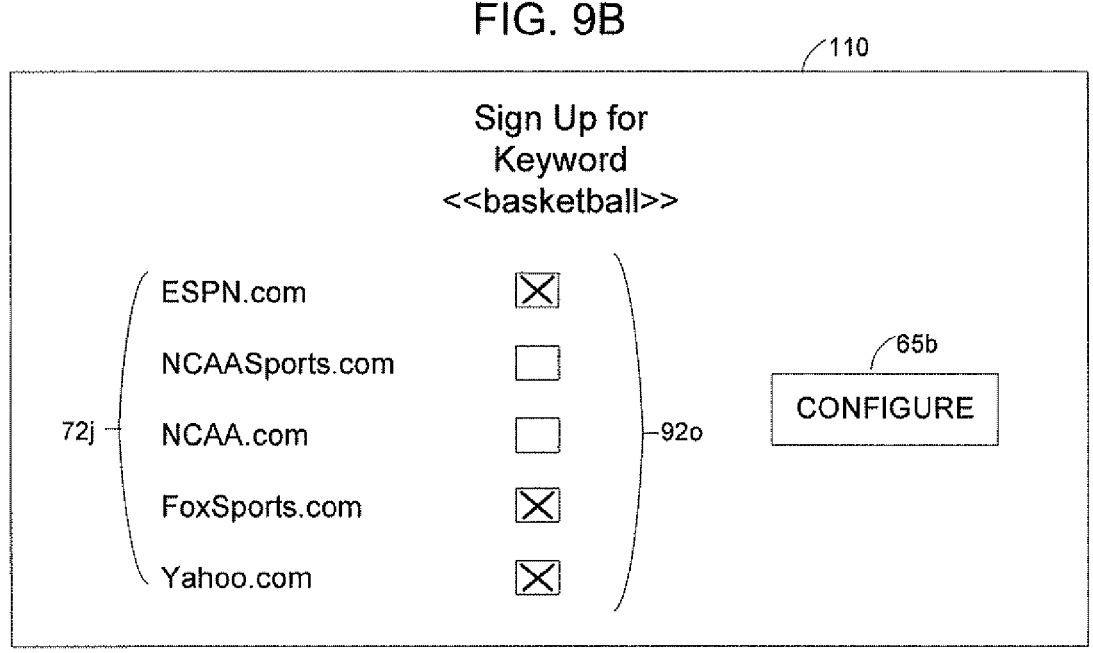

Exemplary sign-up windows preferably displayed when registering to accept requests associated with different categories or keywords are illustrated in FIGS. 9A and 9B. As shown in FIG. 9A, a sign-up window 100 displays resources 72i associated with the category "health" which are displayed to a provider upon registering with the system 20 (FIG. 1). Similarly, a sign-up window 110 displays resources 72j associated with the keyword "basketball" which are provided upon registration to the system 20 (FIG. 1). For example, the sign-up window 100 displays WebMD.com and Medical-News.com as resources defined and activated for the category "health" to a provider who has just registered while the sign-up window 110 lists ESPN.com®, FoxSports.com® and Yahoo.com as resources defined and activated for the keyword "basketball." Further, as indicated by the marks in checkboxes 92n, WebMD.com and MedicalNews.com are currently activated for use for the category "health" and ESPN.com®, FoxSports.com® and Yahoo.com are currently activated for the keyword "basketball" as denoted by marks in checkboxes 92o.

Resources displayed in sign-up windows 100 and 110 display resources as defined by, for example, use by more than half of the registered providers associated with a category or keyword, based on selection by a provider, etc. However, a provider may modify the resources presented in sign-up windows 100 and 110 according to the provider's need. For example, a newly registered provider associated with the category "health" may select NIH.gov and de-select MedicalNews.com as resources prior to selecting the configure button 65a.

The determination of what resources are presented to a new provider may depend, for example, on usage among existing providers who have signed up for that particular category/keyword(s). For example, if 5 of 10 providers for the keyword "basketball" have activated NCAA.com for use, NCAA.com will be provided as a resource associated with the keyword "basketball" in public workspace 82 (FIG. 7). In addition, for existing providers, change in usage of resources may be indicated. For example, if only 3 of 10 providers associated with the category "sports" were using FoxSports.com® when a provider registered to the system 20 (FIG. 1) but now 9 of 10 of the providers use FoxSports.com®, an indicator may be located next to where FoxSports.com® appears in the public workspace 82 (FIG. 7), and may be presented in a screen provided to providers who have not selected it.

Figure 9C:
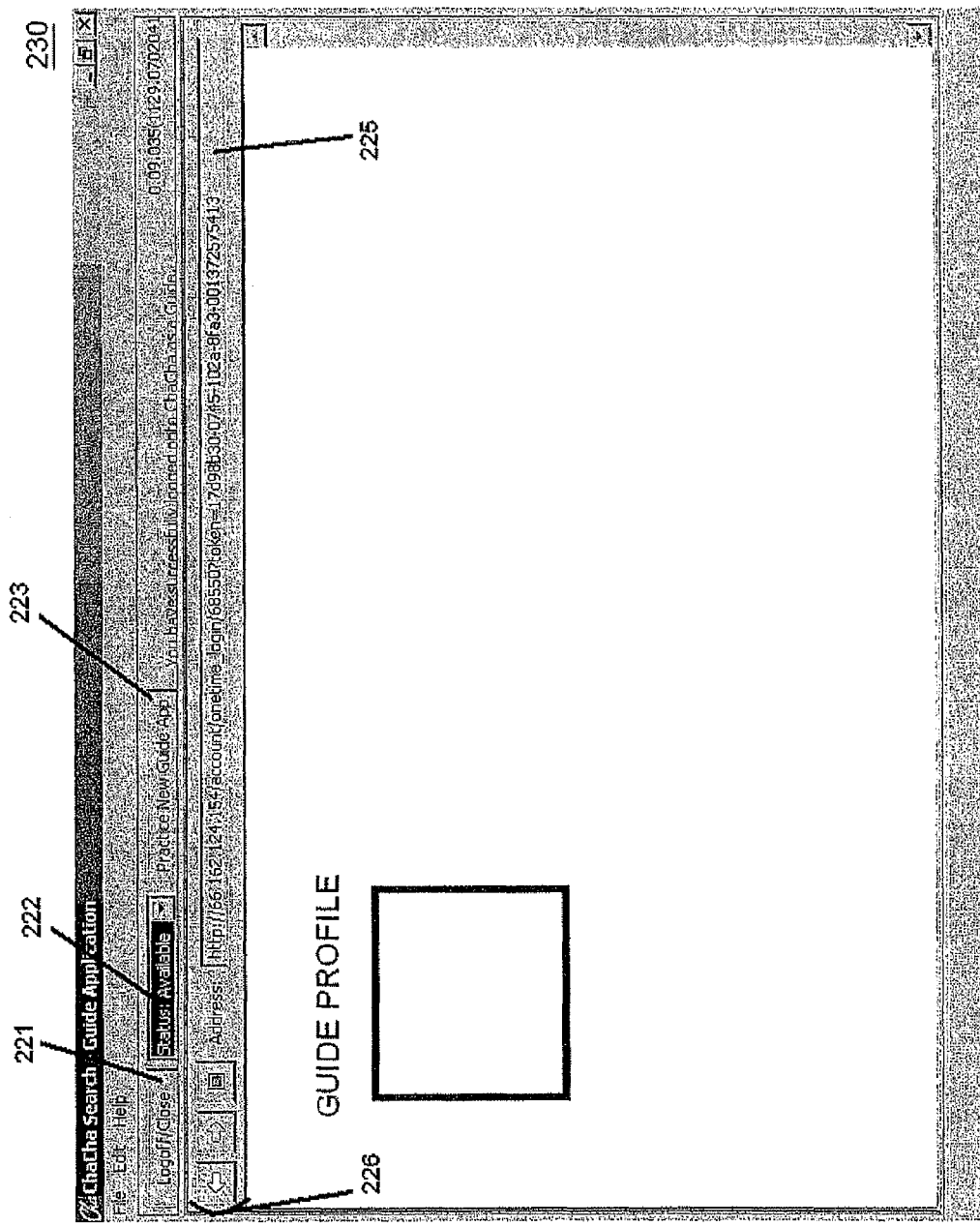
FIG. 9C illustrates an interface for executing search and resource related operations.

FIG. 9C illustrates an interface 230 for executing search and resource related operations in at least one embodiment. When a provider registers with the system 20 (FIG. 1), the provider may be presented with interface 230 for executing a search and/or configuring resource(s). As shown in FIG. 9C, information associated with a provider may be displayed when the provider accesses the system 20 (FIG. 1). For example, the information may be a profile of the provider and may include a list of one or more categories for which the provider has registered, personal attributes, skills and interests, recently conducted searches, level of the provider (i.e., apprentice, pro, and master), or any other provider-specific data.

The interface 230 may also display data pertaining to products and/or services recommended by the provider, advertisements, news, promotions, data of other providers ("buddy network") associated with the particular provider, etc. For example, the provider may choose to include other providers on a "buddy" list or within a network of friends, with which the provider may share information, exchange messages, etc. Although specific examples of the information displayed via the interface 230 are discussed, the disclosed interface is not limited to presenting any particular information and may include an audio file, an image, multimedia data, text, a link, etc.

The interface 230 may include a logoff/close button 221 for ending a session, a status indicator menu 222 for indicating a provider's (guide's) availability, a practice button 223 enabling a provider to use the interface 230 for training purposes, and an address 225 generated by the system 20 (FIG. 1) verifying the provider. The address 225 may indicate an identifier (i.e., unique ID) of the provider and the associated logon session, and/or a one-time use token. When a provider indicates unavailability using the status indicator menu 222, search and training related notifications may not be directed to the provider while such notifications may be provided when the status of the provider is indicated as available. The interface 230 may be provided with navigation tools 226 enabling the provider to navigate through information displayed, which may be similar to typical graphical user interfaces of application programs (e.g., browsers) that provide navigational capabilities. The provider or guide is able to navigate forward and backward as information is presented using the interface 230.

The practice button 223 enables provider(s) to use the search tool portion of the interface 230 when there is no pending request from a requester (i.e., InfoSeeker™). A provider may be able to practice performing a search, posting results or accumulating links, etc., without the time pressure associated with serving a customer. In addition, in a situation where a number of requesters is less than a number of available providers, selected provider(s) may be directed to a training task, such as a supervised interactive search with a human trainer as described in U.S. Ser. No. 60/820,181, titled METHOD, SYSTEM, AND COMPUTER READABLE STORAGE FOR PODCASTING AND VIDEO TRANING IN AN INFORMATION SEARCH SYSTEM, inventor Scott A. Jones, et. Al., filed Jul. 24, 2006, which is incorporated herein by reference. For example, the system 20 (FIG. 1) may determine activities of the provider(s) (available or unavailable) at any given time and direct certain provider(s) (i.e., inexperienced, newly registered for a keyword, etc.) to a training session during an idle time.

Figure 9D:
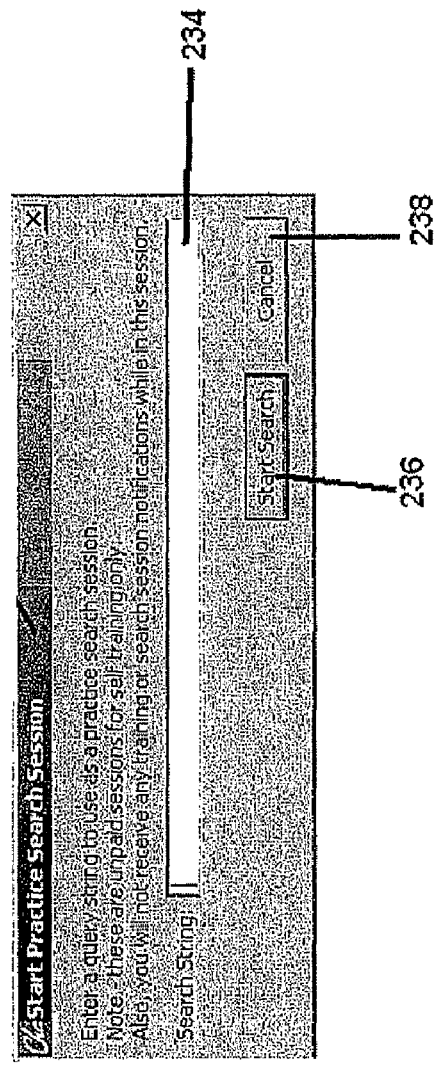
FIG. 9D illustrates an interface for triggering a search.

When the practice button 223 is selected, window 232 illustrated in FIG. 9D may be displayed. As shown in FIG. 9D, the window 232 includes a search query entry field 234 for entering one or more keywords to be used as a target phrase for conducting a search, a start search button 236 for triggering a search session and a cancel button 238 for ending the practice search session. For example, the provider may input "NFL football Colts", "NFL", "football", "Colts" or any variation of keyword(s) or phrase(s) to act as the starting query of a search. While the interface 232 is described using exemplary graphical user interfaces for executing operations, components of the interface 232 are not limited to any particular graphical user interfaces.

Figure 10A:
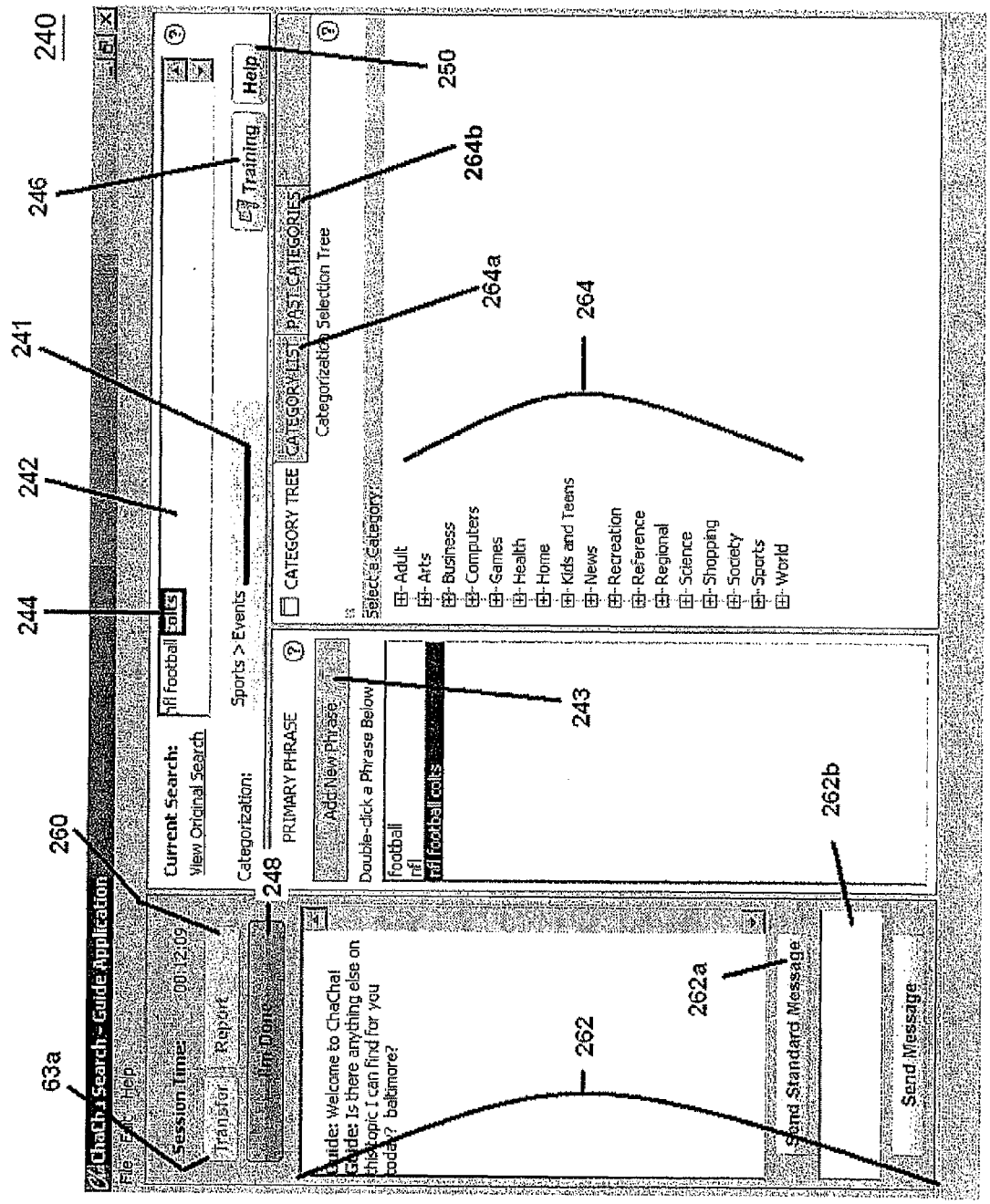
FIGS. 10A through 10E illustrate phases of a Graphical User Interface (GUI) for managing and sharing resource(s) associated with at least one category and keyword(s) and/or phrase(s).

FIG. 10A illustrates interface 240 for managing resources associated with a keyword and/or phrase and a given category/subcategory combination, which is referred to as a Qualified Key Word (QKW). As shown in FIG. 10A, the interface 240 includes a field 242 displaying a request (partial or whole) submitted to the system 20 (FIG. 1) by a requester. For example, a provider (or guide) may select to highlight a portion of a search string from a requester that the provider believes is pertinent, or the search string in its entirety, in the field 242 for conducting a search. The provider may specify the object of the search by modifying keyword(s) in the field 242. Alternatively, the system 20 (FIG. 1) may identify the dominant keyword in the search string in the field 242 based on previous keyword(s) and/or phrase(s) for which the provider has registered.

The interface 240 may include an indicator 244 identifying a primary keyword or phrase for the search, a training flag 246 indicating whether the interface 240 is currently being used for human assisted training purposes (i.e., new providers) as described above, and/or a help button 250 for requesting application assistance. A phrase or keyword in a request may be identified as "primary" based on previous use of the phrase or keyword as a primary subject of search(es), indication by the system 20 (FIG. 1), uniqueness or generality of the phrase or keyword, selection by administrator of the system 20, etc. Using the example request in the field 242, the keyword "colts" or "football" may be highlighted as a primary keyword. As another example, the phrase "heater working car" may develop as a primary phrase based on usage of the phrase in association with previous searches.

The interface 240 may include a transfer button 63*a* enabling the provider to pass a request to another provider who may be better suited to handle the request and a report button 260 allowing a provider to send report(s) to the system 20 (FIG. 1). For example, provider(s) may send various types of reports to administrators of the system 20 (FIG. 1) including but not limited to fraudulent requests from requesters, misuse of the system 20, unusable resource(s), etc.

As shown in FIG. 10A, the request displayed in the field 242 is currently categorized under the category "sports" and the subcategory "events", as shown by the categorization indicator 241. In a preferred embodiment, when a request that has never been categorized is received via the system 20 (FIG. 1), the provider may be requested to establish categorization in relation to the request prior to proceeding with a search. The interface 240 enables the provider to establish categorization for a particular request including for any keyword(s) and/or phrase(s) contained in the request. Any of the keywords or combination thereof contained in the request "NFL football Colts" shown in the field 242 may be selected by the provider as a primary object for a search and may be categorized. For example, the provider may highlight the keyword "Colts", select a pop-up option to set the keyword as a primary object for a search, and categorize the keyword with the category "news" and the subcategory "breaking news." While FIG. 10A illustrates interface 240 using particular categories and subcategories, a request is not limited to being associated with any particular categories and/or subcategory taxonomy.

The provider may also add a new phrase to the current search using an add new phrase button 243. Using the example of the request directed to "NFL football Colts", the provider may add the word "Indianapolis" to the search query, set the keyword "Indianapolis Colts" as primary object of the search and categorize the keyword in the category "Sports" and the subcategory "football."

The interface 240 may include a list 264 displaying a category tree to assist a provider in establishing a category and/or subcategory for keyword(s) and/or phrase(s). The interface 240 may also include category list 264*a* and past categories list 264*b* to provide an alternate way of viewing and selecting categories to assist the provider in finding a desired category. The category list 264*a* may be presented such that when the provider begins typing characters of a category name, a list of categories matching the characters including respective subcategories may be displayed. On the other hand, the past categories list 264*b* may display a list of categories used previously in association with the selected primary keyword or phrase. To assign a category to a request (or a keyword contained in the request), a provider may double-click on or otherwise select any of the categories listed or displayed under the category tree 264, the category list 264*a* and the past categories list 264*b*.

The interface 240 may also include a communication interface 262, enabling a provider to communicate with a requester submitting a request. The communication interface 262 may include a standard message option 262*a* for selecting an automated and/or pre-stored message to be sent to the requester and an input field 262*b* enabling the provider to type a message. The provider may also modify the standard or automated message(s). For example, the provider may select a predetermined message previously prepared (by the provider or made available by the system 20 (FIG. 1) as a default), add text relevant to a current search, and send the message to the requester.

When a provider completes a search session, the provider may indicate completion using the "I'm Done" button 248. Subsequent to sending results to the requester, the provider may verify that the requester is satisfied with the results of the search and may indicate completion of the search session via the "I'm Done" button 248, or if the provider is unable to find what the requester is looking for or determines that a guide with more specific knowledge of the new category/subcategory is needed, etc. the provider may transfer the request to another provider using the transfer button 63*a*. While the interface 240 is described using exemplary graphical user interfaces for executing operations, components of the interface 240 are not limited to any particular graphical user interfaces.

Figure 10B:
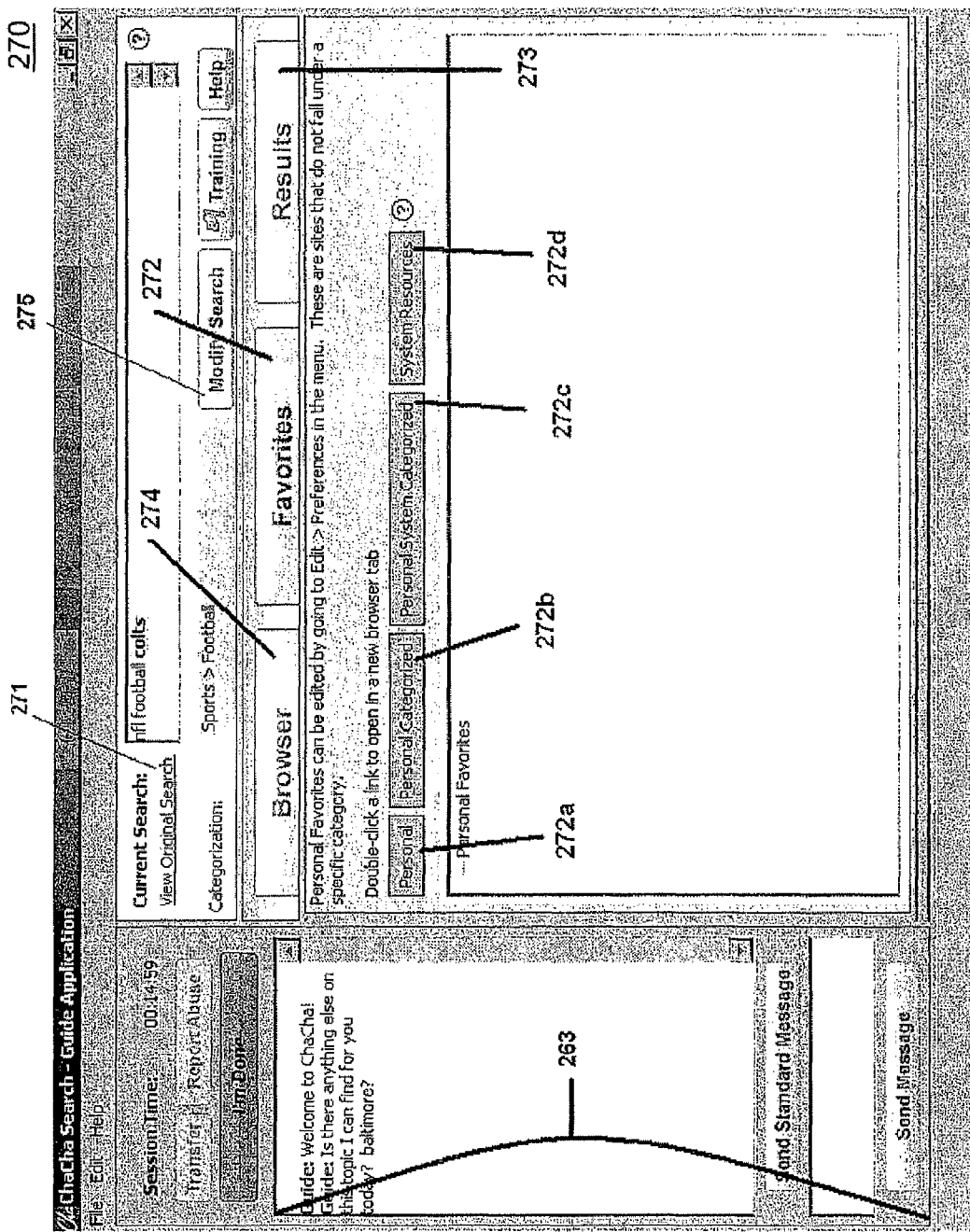

FIG. 10B illustrates interface 270 for managing resources. When the provider completes categorization and selection of the primary keyword/phrase of a query using the interface 240 (FIG. 10A), the interface 270, providing a browser tab 274, a favorites tab 272 and a results tab 273 may be presented. The favorites tab 272 enables the provider to manage resource(s) associated with the categorized keyword or phrase. In a preferred embodiment, when the provider has established a target categorization (category and subcategory) with respect to one or more keyword(s) or phrase(s) of a request, the interface 240 (FIG. 10A) may automatically indicate completion. Further, the interface 270 may be disabled until the request is indicated as being properly categorized as determined by the system 20 (FIG. 1). The browser tab 274 and the results tab 273 are explained in detail below with respect to FIGS. 10D and 10E, respectively.

As shown in FIG. 10B, the interface 270 activated by the favorites tab 272 includes selectable option buttons for displaying and using personal 272*a*, personal categorized 272*b*, personal system categorized 272*c* and system resources 272*d*. Selecting the personal 272*a* button enables the provider to manage resource(s) which may not necessarily fall under a specific category or which may be generalized search resources, such as Google®, Yahoo!®, or DMOZ. The personal categorized 272*b* option may be used to manage resource(s) that may fall under a provider-defined category. For example, a provider may store resource(s) that may be used for general subject matter which he or she may not want associated with a particular category under the personal 272*a* option and may store a more specific search resource such as a personal database, a directory database that has restricted access, or a searchable resource which does not align with a system-defined category under the personal categorized 272*b* resources option based on a category defined by the provider.

Resource(s) which the provider may want to associate with the system 20 (FIG. 1) defined category(ies) and/or subcategory(ies) may be stored and accessed using the personal system categorized 272*c* option. Resource(s) accessed using the personal system categorized option may be resources with restricted access, which may be used by a provider for queries associated with a system defined category, subcategory and/or keyword. Resource(s) associated with a system defined category of a search may be automatically presented and accessed using the system resources 272*d* option. For example, NFL.com may be presented under the system resources 272*d* option when the request "NFL football Colts" is categorized under the category>subcategory "Sports>Football." In a preferred embodiment, resource(s) under the system resources 272*d* option may be assigned based on system parameters such as resources most used by the provider community, as defined by an administrator of the system 20 (FIG. 1), based on an agreement with a source of the resource (i.e., contract with provider of a resource), etc. In addition, resource(s) under the system resources 272d option may be shared among providers registered to do searches pertaining to a keyword or phrase with which the resource(s) are associated. Resource(s) using the personal system categorized 272c option may be presented to the provider when a search request is associated with a category by the system or by the provider.

A provider may upload information regarding resource(s) which the provider has added as a favorite using the provider's browser (on any particular keyword and/or category) and may share the resource(s) manually or automatically, among other providers registered with the system 20 (FIG. 1). Accordingly, the system 20 (FIG. 1) allows provider(s) to obtain, record and share information about any of the diverse resources that providers use or discover. Sharing of resource (s) may be accomplished in a number of ways. In a preferred embodiment, when a personal favorite resource is utilized by a provider to return a result, the resource may be added to and displayed when the system resources 272d option is selected by any provider(s) associated with a keyword and/or category of a request triggering the result. Further, the system resources 272d option may display recommended favorite resources to providers. For example, resources most often used by other providers for searches associated with a category, system selected resources based on keywords of the request, system-sponsored resources associated with a keyword, or category, etc., may be displayed to provider(s) as recommended favorites.

Similar to the interface 240 in FIG. 10A, the interface 270 may include a communication interface 263 for communicating with the requester submitting the request. Further, at any point during categorization of a keyword or phrase or conducting a search, the provider may select the view original search 271 option to change the search query string back to the initial search string submitted to the system 20 (FIG. 1).

The interface 270 may also include a modify search button 275 for enabling a provider to revise the query or change categorization, if needed. For example, during interaction with the provider using the communication interface 263, the requester may indicate interest in articles about a specific player of the Colts, at which point the provider may modify the request "NFL football Colts" to "NFL football Peyton Manning" using the modify search button 275. Likewise an initial query "bass" might be categorized under "Recreation>Outdoors", but during interaction, the provider or guide could discover that the user was interested in the bass guitar, and so needed to categorize the search under "Arts>Music" in order to obtain appropriate search resources. While the interface 270 is described using exemplary graphical user interfaces for executing operations, components of the interface 270 are not limited to any particular graphical user interfaces.

Figure 10C:
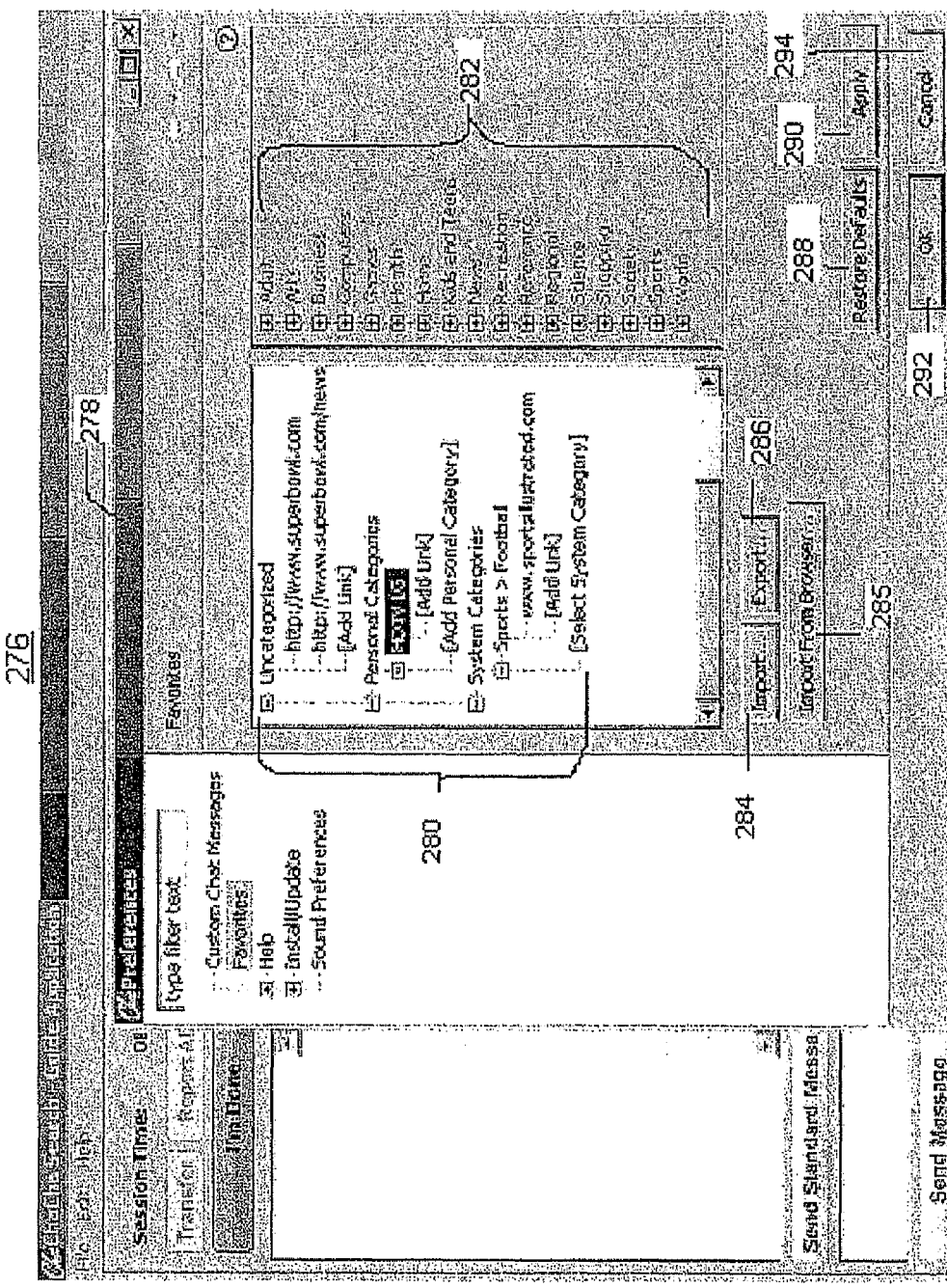

Resource(s) displayed and accessed using the favorites tab 272 may be edited using interface 276 shown in FIG. 10C. For example, to modify resource(s), the provider may choose preferences from the edit menu option provided via the interface 270. As shown in FIG. 10C, the interface 276 may include a preferences window 278 providing a pick list 280 for managing resource(s) as favorites. Using pick list 280, the provider may edit resources including adding/deleting a resource (i.e., web page, Internet directory, etc.), editing URL or description, etc., to be used under uncategorized, personal categories and/or system categories. Resource(s) may be added under uncategorized without having to specify a category. These could be general use search sites (i.e., Google®, Jux2, Yahoo!®, Hakia®, etc.), while resource(s) stored under personal categories and system categories may be associated with one or more categories.

As mentioned above, the uncategorized favorites may include resource(s) that the provider wants to use without specifying any category. The personal categories item from the pick list 280 enables the provider to create categories (for example, related to the provider's keywords) for favorite web pages or other resources that the provider may want to store and/or use during a search session directed to a more specific topic, which is not already categorized in the search system 20. The system categories option enables the provider to store resource(s) under categories already defined by the system 20. The resources can be utilized by the provider for search (es) on keyword(s) which are determined to fall within those system category/subcategory classifications by the search system, or due to active selection by the provider, as described above.

A provider may define a personal category, and/or add resource(s) under the defined personal category by typing a URL or using the import 284 button to use lists of URLs, etc., from applications such as a browser and associate the resource(s) with the provider-defined category. For example, a provider may define "Sony HDTV" as a personal category which may be more specific than the categories defined by the system 20 (FIG. 1) and associate a specific URL (e.g. http://www.learningcenter.sony.us/assets/hpd/hdtv/) with the category. Similarly, a provider may specify a category labeled "NFL football Vietnam" and associate a web page written in Vietnamese which contains NFL® football information with the category. As such, the personal categories may be independent of categories defined by the system 20 (FIG. 1).

Personal resources associated with system defined categories may be defined by using the pick list 280 and selecting a system category and/or subcategory from a list 282 and associating resource(s) with the system category and/or subcategory. For example, a provider may select the category "Sports" and the subcategory "Football" and add "sportsillustrated.com" as a personal resource under this system category, by importing the resource info from a file, by directly entering that data, by importing data from a browser, etc.

The interface 276 enables a provider to create, store, organize, categorize, add, delete, share and/or work with favorite resources, thereby allowing the provider to build a collection of resources and use the resources to provide targeted, relevant results to a requester as quickly as possible. A provider may also use the import button 284 to add resources into his favorites, for example, from a personal hard drive, etc. Resource(s) information may also be stored locally by selecting the export button 286 to export resource information For example, a file containing an exported resource may subsequently be imported to be associated with another category or to restore favorites in a situation where a provider may need to re-install an application used to access the system 20 (FIG. 1). Providers might also share resource information by sending files containing resource data via email, file transfer protocol (ftp) or any other suitable transmission method.

The interface 276 may also include an import from browser button 285 for importing resource information stored by a browser and/or a restore defaults button 288 for restoring default favorite resource(s). The apply button 290 allows the provider to accept a set of changes to resource data and associations as selected by the provider. When the provider has completed modifications to the resource(s), the provider may indicate task completion using the OK button 292, or may close the preferences window 278 without making changes using the Cancel button 294. For ease of explanation, the interface 276 is explained using graphical user interfaces, however, the disclosed system and method are not limited to any particular type of user interface for interacting with the system 20 (FIG. 1).

Accordingly, once a provider has selected a category for a keyword or phrase of the request, the interface 270 (FIG. 10B) provides respective resource(s) that the provider may have customized to assist in searches. The provider may use the buttons 272a, 272b, 272c and/or 272d to select any of the resource(s) stored under the selectable options personal 272a, personal categorized 272b, personal system categorized 272c and system resources 272d and trigger a search using corresponding resource(s) via interface 270 shown in FIG. 10B. The provider may view and interact with the selected search resources by selecting the browser tab 274 from the interface 270. For example, a commonly used general resource(s) may be selected to be used for a search using the personal resources option 272a, and a more specific resource might be used for the same search using the personal system categorized resources option 272c. The results of the search from those resources could then be displayed in the tabs 314a, 314b, and/or 314c in the Browser tab 274 of the interface 300 as illustrated in FIG. 10D.

Figure 10D:
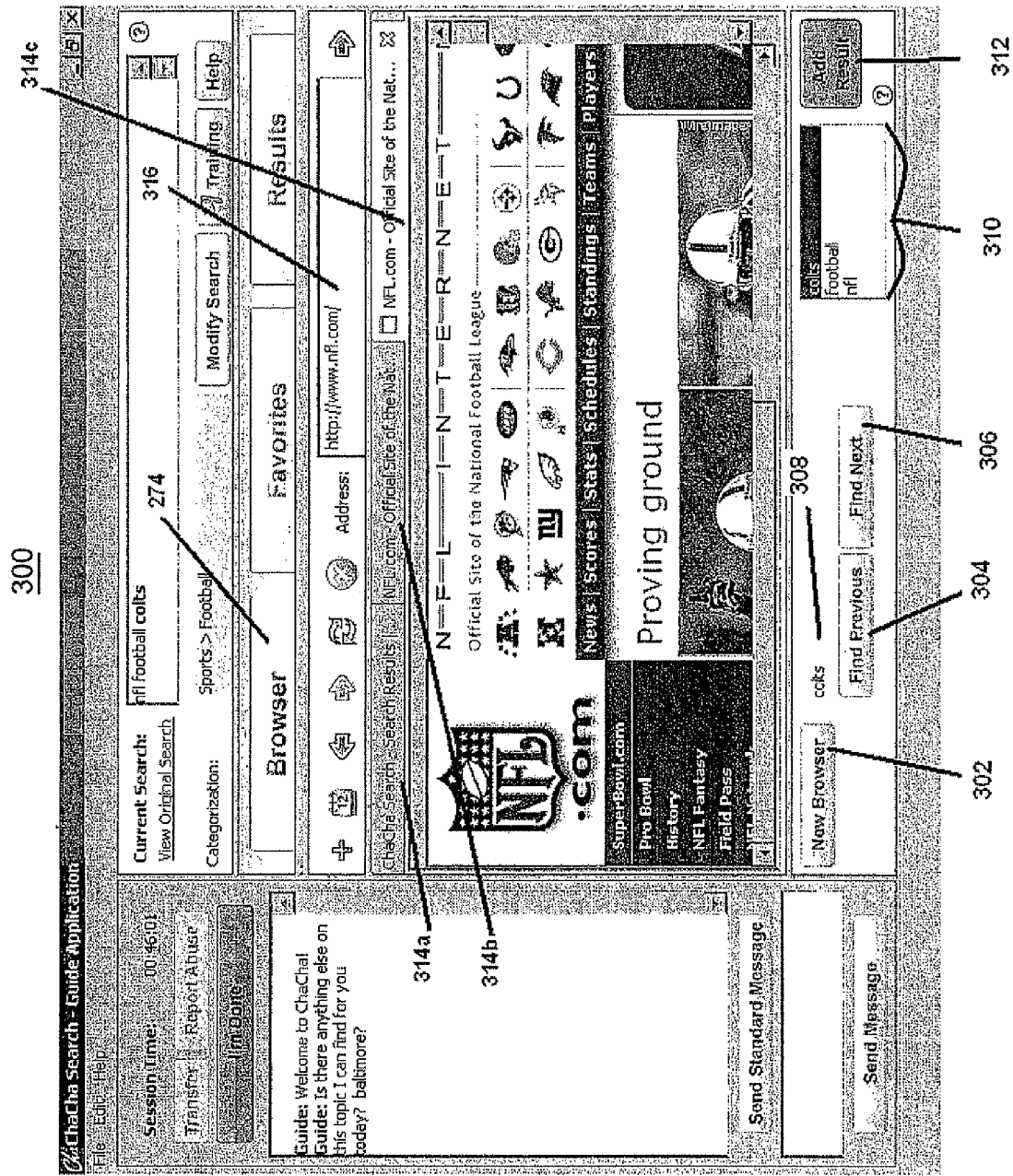

As shown in FIG. 10D, the browser window 274 may include a new browser button 302, a find previous button 304, a find next button 306 and an add result button 312. The new browser button 302 enables the provider to launch a new blank tab in the browser and enter a search resource URL in the address window 316. For example, as illustrated in FIG. 10D, the browser window includes tabbed browser windows 314a, 314b, 314c displaying contents from the ChaCha® search engine, NFL.com, etc. The multiple windows may be maximized/restored or minimized with standard interactions by a provider.

The browser window 274 may display content of a resource and indicate (i.e., highlight) a primary keyword/phrase in the content of the resource. Using the find next button 306 and the find previous buttons 304, a provider may search through the content for the indicated keyword/phrase. To find the next occurrence of a primary keyword 308 (in this case, the keyword "Colts") that is categorized and used in the search, the provider may select the find next button 306. Similarly, to find the previous occurrence, the provider may use the find previous button 304. The provider may switch between different keyword(s) or phrases to be used as the object of the search by selecting any of the keywords or phrases listed in the keyword pick list 310.

Figure 10E:
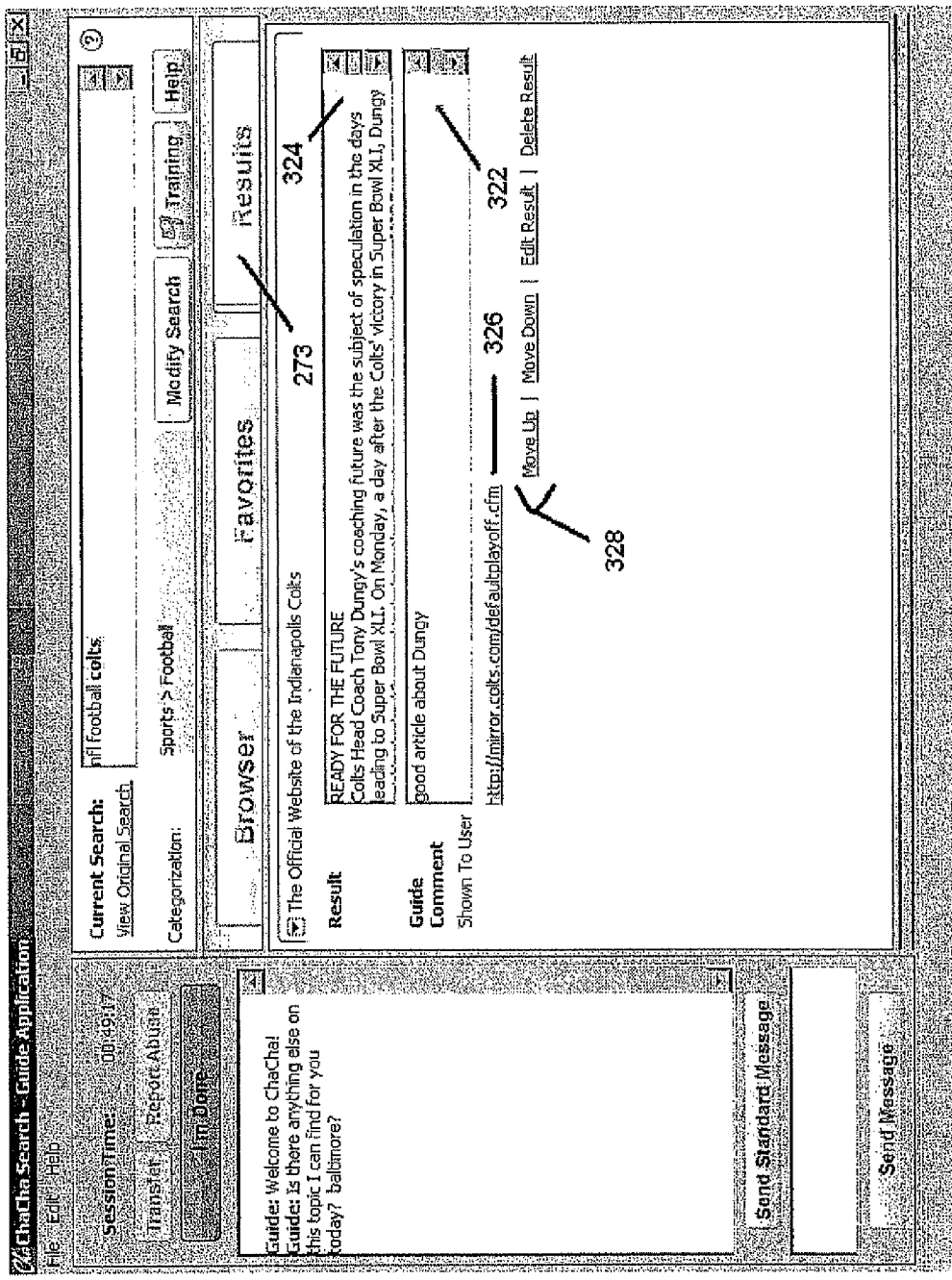

When a provider wants to add content as a result to be displayed to an InfoSeeker™ as a response to a request, the provider selects the content in the resource to be added and selects the add result button 312 to transfer the data to the Results window. For example, a provider may select a sample text from a web page by dragging a mouse or double-clicking and press the add result button 312 to send the web page with the highlighted text to the requester. A result selected to be added by the provider may be displayed using interface 320 illustrated in FIG. 10E. As shown in FIG. 10E, interface 320 includes the tabbed results window 273 having a result 324 selected by the provider in response to the request, a URL 326 of the result and a provider or guide comment 322 to be displayed to the requester with the results. For example, the provider may insert a personal description of a link to be provided as a result and send the comment to the requester.

The provider may manage results using the results window 273. A provider may change the order in which the results are presented to the requester, to delete, or edit the results using selectable options 328. For example, a provider may list what he considers to be the most relevant result first and the other result(s) following the same ranking. In a preferred embodiment, the results 273 are instantly displayed to the requester as they are added using the add results button 312 (FIG. 10D) by the provider. Alternately, the provider may accumulate and edit results before sending them as a group to the requester.

FIG. 11 illustrates a resource entity relationship 165. As shown in FIG. 11, primary data structures are provided for provider (or PaidSearcher™), the resource, the category resource and the keyword resource. The primary data structures include relationships pointing to other data types including category, subcategory, qualified keyword and keyword. For example, each provider is associated with a paid searcher data structure maintaining data related to ID, first and last name, user ID, password, etc., and each resource is associated with a resource data structure pertaining to ID, title, URL, description, creator (created by), shared, etc.

FIG. 12 illustrates a structure of a query used in the system 20 (FIG. 1). As shown in FIG. 12, an original query text submitted by a requester is parsed to identify individual keyword(s) in the query including corresponding category, subcategory and keyword(s). A rank may be assigned to a keyword based on influence of the keyword against other keywords in a query based on, for example, use of the keyword for retrieving information by providers, overall frequency of usage by providers and/or requesters, frequency of occurrence in web documents, search queries from other search engines, etc. The "Value" attribute of the "Keyword" element in the XML message may contain an actual keyword/phrase ("nike"). Also, for presentation, the matching end-tags (those identified with the "</" string) should be at the same tab-level as the begin-tag (the matching tag without the "</" prefix). Additionally, all tags/elements listed between the begin-tag and end-tag should be indented one tab-stop.

Identifying keyword(s) in a query text may include disregarding commonly used words ("stop words") such as "the", "a", "of", etc., that appear in the query submitted by a requester. The identified keyword(s) of a query are matched with resource(s) associated with the keyword(s). For example, the query "Nike basketball shoes" may be identified as containing the keywords "Nike" and "shoes" qualified by the category "basketball" which may be associated with use of Nike.com, Yahoo.com and NBA.com as resources, respectively.

The query structure illustrated in FIG. 12 may be, for example, an XML message providing a breakdown of a user submitted query including associated resource(s). The resource(s) corresponding to category, subcategory and keyword contained in a given query may be ordered by influence. For example, a resource associated with a particular keyword contained in a query may be ranked higher than a resource associated with a category that has multiple subcategories and/or keywords associated therewith. However, the present invention is not limited to any particular order of presenting resource(s). For example, resources may be ordered according to each keyword in a query based on usage preference of associated providers.

The query structure shown in FIG. 12 may be presented to both a provider (PaidSearcher™) and a requester (Infoseeker™). The structure may be presented to a provider as an XML message in response to the provider's acceptance of a request to provide resource(s) that are used by the specific provider. On the other hand, an XML message may be presented to a requester when the requester submits a query without provider assistance to present the requester with resource(s) recommended by provider(s) associated with a keyword(s) and/or category of a query.

Figure 13:
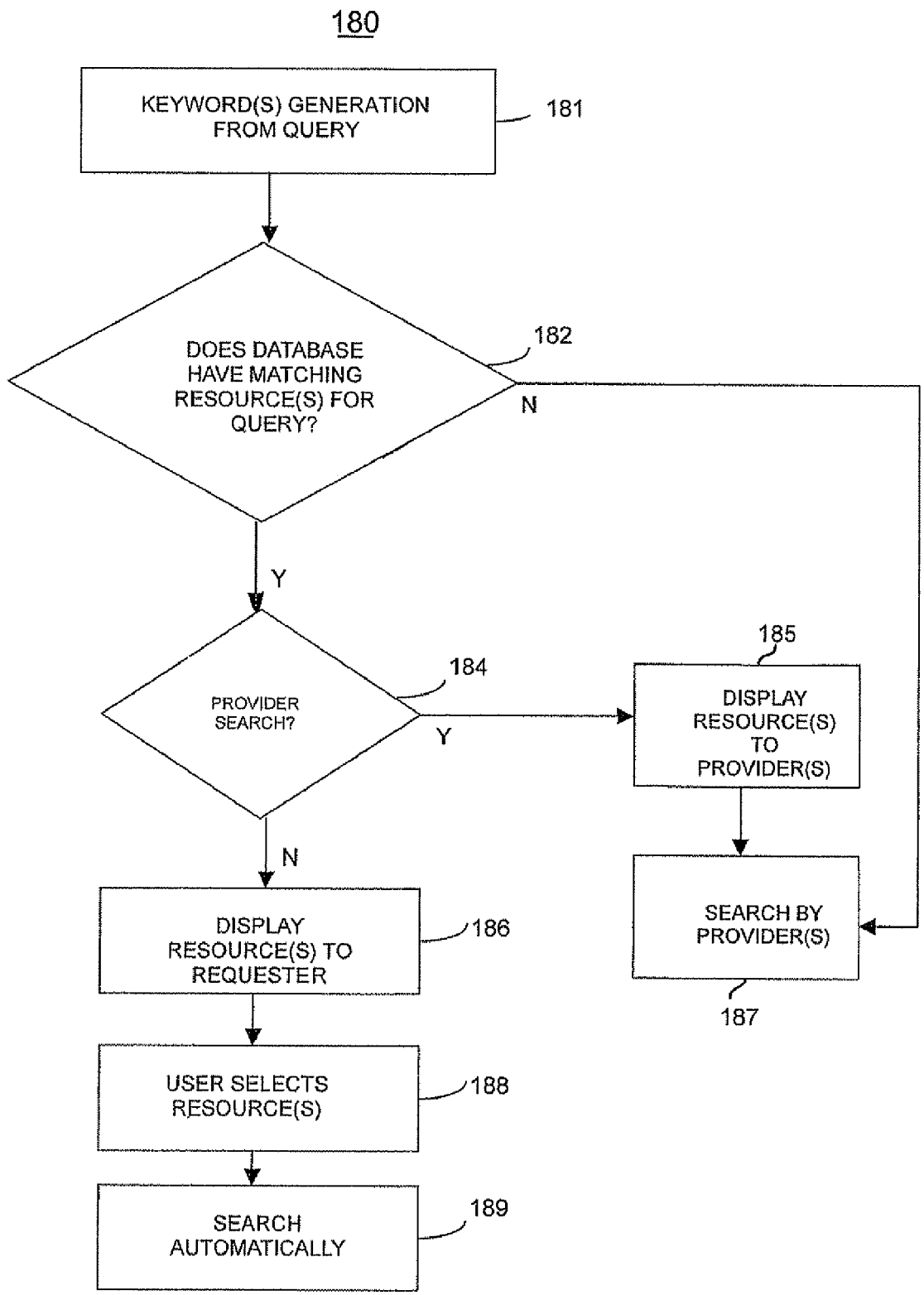
FIG. 13 illustrates a flowchart for providing resource(s) based on association with keywords.

FIG. 13 illustrates process 180 for providing resource(s) associated with keyword(s). As shown in FIG. 13, process 180 begins by keyword generation 181 from a query. As discussed above, a query may entail a fully-formed question/sentence, keyword(s) or a search phrase, etc. A keyword may be generated from a query based on, for example, a weighting attached to each keyword as indicated in the database 24 (FIG. 1), usage of the keyword over time with respect to queries or to retrieve results in response thereto, or any other factor that may affect determination of relevancy of a keyword in the context of a query for developing relevant results. For example, if "basketball player Austin Croshere" is submitted as a query, the keyword "Austin Croshere" may be ranked higher than the keyword "basketball player" because "Austin Croshere" is more specific.

After keyword generation 181 from the query, process 180 moves to determining 182 whether the database has matching resource(s) for the query. For example, for the query "basketball player Austin Croshere", assuming keyword "Austin Croshere" is generated 181, resource(s) such as NBA.com, ESPN.com®, etc., may be determined to match 182 the query. When it is determined that there are no matching resource(s) for the query, the query is submitted for search by provider(s) 187.

On the other hand, upon determining that there are matching resource(s) for the query, process 180 continues to determining whether the search is a provider search 184. When it is determined that the query is submitted for a provider search, the resource(s) are displayed to the provider(s) 185 and the search by provider(s) 187 is initiated. For example, a requester may be inexperienced in the subject matter of the query, unable to locate relevant information, under a time constraint, etc., and may request a provider search to get assistance from one or more providers for conducting a search in response to the query.

When it is determined that the query submitted by a requester does not request a provider search, the resource(s) are displayed to the requester 186. For example, a requester may be an experienced searcher, may have a desire to review results from resource(s) for locating information of a particular subject matter, or may want to conduct a search without provider assistance due to the nature of the query, or for any other reason. In such a situation, the resource(s) are displayed to a requester 186 without requiring submission of the query to provider(s) for a provider search.

Subsequent to displaying resources to the requester 186, process 180 allows the user to select resource(s) 188 and search automatically 189. For example, the resources such as NBA.com, ESPN.com®, etc., may be displayed as resources matching the keywords "Austin Croshere" while resources such as WebMD.com, NIH.com, etc., may be determined to match a query directed to the category "health." Accordingly, the requester is enabled to select any of the displayed resource(s) for conducting the search automatically.

Information about resource(s) used by providers to return information to requester(s) such as search engines, Internet directories, etc., or any other source of information that can be electronically searched are maintained in a database 24 (FIG. 1). The resources are associated with at least one category, subcategory and/or keyword and are made accessible for retrieving information in response to a query related to the category, subcategory and/or keyword.

This allows a resource(s) utilized in search(es) associated with a category or keyword to be provided to assist subsequent search(es) associated with the category or keyword, for example, for assisting newly registered providers, for enabling sharing of resource(s) among providers, etc.

Accordingly, the disclosed method and system enable collaborative filtering of resources used for searches and provides efficient and effective use of resources for returning accurate results.

While the system and method have been disclosed as associating resource(s) utilized in search(es) with a category or keyword, the same method may be used to associate a resource(s) and a search(es) with other types of metadata without loss of generality. For example, a search resource(s) and a search(es) may be associated with a tag(s). The use of tagging is well known in the current published art, and has been popularized by sites such as Flickr™, Gmail™, and Wikipedia®. A tag(s) may be associated with a resource(s) and/or a query(ies) in any suitable manner.

For example, a tag(s) may be associated with a resource by the publisher of the resource. As another example, a tag(s) may be associated with a resource and/or query by guide(s) (or provider(s)). A tag may be associated with a resource and/or query by concurrence of a group of one or more humans in a different example. Likewise, a tag(s) may be associated with a resource(s) and/or query(ies) by incorporation of an external database.

While the system and method have been disclosed as utilizing a specific number of classification levels, the same method which incorporates any number of classification levels. For example, a 2 level taxonomy (category, keyword), or a 4 level taxonomy (category, subcategory, sub-sub category, keyword) may be used in other embodiments.

The many features and advantages of the claimed invention are apparent from the detailed specification and, thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope of the claimed invention. It will further be understood that the phrase "at least one of A, B and C" may be used herein as an alternative expression that means "one or more of A, B and C."

What is claimed is:

1. A computer-implemented method, comprising:
   tracking, via a computer, resources used to retrieve information related to a keyword;
   displaying the tracked resources to each provider associated with the keyword, said displaying including indicating resources shared among providers and ranked usage data of the resources based on percentage of the providers using the resources;
   indicating resources activated for use with different characteristics than non-activated resources;
   enabling a provider among the providers to configure the resources to be provider specific including providing an input box for entering an additional resource, setting resources to be shared with other providers and selecting a particular resource as a favorite;
   supplying results from the tracked resources to requester(s) including when the providers are unavailable to accept a query from a requester; and
   automatically directing the query having the keyword to at least one of the resources when the keyword is submitted as part of the query.

2. A computer-implemented method, comprising:
   storing, via a computer, resources utilized for searches in association with categories identified with the searches;

displaying the stored resources to each provider associated with a keyword, said displaying including indicating resources shared among providers and ranked usage data of the resources based on percentage of the providers using the resources;

indicating resources activated for use with different characteristics than non-activated resources;

enabling a provider among the providers to configure the resources to be provider specific including providing an input box for entering an additional resource, setting resources to be shared with other providers and selecting a particular resource as a favorite;

supplying results from the stored resources to requester(s) including when the providers are unavailable to accept a query from a requester; and selecting a resource among said resources for the query submitted based on the keyword contained in the query and a category of the query in accordance with said association.

3. A computer-implemented method of accessing resources, comprising recording, via a computer, prior usage of resources in association with a keyword or category;

displaying the recorded resources as public resources to providers associated with the keyword or category, said displaying including indicating resources shared among providers and ranked usage data of the resources based on percentage of the providers using the resources;

indicating resources activated for use with different characteristics than non-activated resources;

enabling a provider among the providers to configure the resources to be provider specific including providing an input box for entering an additional resource, setting resources to be shared with other providers and selecting a particular resource as a favorite;

supplying results from the recorded resources to requester(s) including when the providers are unavailable to accept a query from a requester; and enabling each of the providers to selectively use the resources.

4. A computer-implemented method of providing use of human selected resources, comprising:

maintaining, via a computer, a record of previously used resource in association with a subject matter of a request for which results were returned;

providing the record of previously used resource for a search when a new request matching the subject matter of the previously used resource is submitted;

displaying the record of the previously used resource to each provider associated with the subject matter and indicating resources shared among providers and ranked usage data of the resources based on percentage of the providers using the resources;

indicating resources activated for use with different characteristics than non-activated resources;

enabling a provider among the providers to configure the resources to be provider specific including providing an input box for entering an additional resource, setting resources to be shared with other providers and selecting a particular resource as a favorite; and supplying results from the previously used resource to requester(s) including when the providers are unavailable to accept a query from a requester.

5. A computer-implemented method for sharing and accessing resources, comprising:

recording resources in association with a keyword or category based on one of prior usage of the resources, popularity of the resources among providers registered for the keyword or category, or default status of the resources as defined by the providers;

adding a new resource associated with the keyword or category upon determination that the new resource is not among the recorded resources;

displaying the recorded resources to each provider associated with the keyword or category, said displaying including indicating resources shared among the providers and ranked usage data of resource(s) based on percentage of the providers using the resources;

indicating resources activated for use with different characteristics than non-activated resources;

enabling a provider among the providers to configure the resources to be provider specific including providing an input box for entering an additional resource, setting resources to be shared with other providers and selecting a particular resource as a favorite; and supplying results from the recorded resources to requester(s) including when the providers are unavailable to accept a query from a requester.

6. The computer-implemented method according to claim 3, wherein the public resources are indicated to a provider.

7. The computer-implemented method according to claim 5, wherein the recorded resources are distributed to providers registered to conduct a search pertaining to the keyword or phrase and/or the category.

8. The computer-implemented method according to claim 5, wherein the recorded resources are made available for subsequent search requests containing the keyword or phrase.

9. The computer-implemented method according to claim 5, wherein the category is defined by the provider.

10. The computer-implemented method according to claim 5, comprising:

displaying resources commonly used by providers registered for the keyword or phrase in addition to a resource selected by the provider.

* * * * *